US012693245B2

(12) United States Patent
Abe et al.

(10) Patent No.: US 12,693,245 B2
(45) Date of Patent: Jul. 28, 2026

(54) MEASUREMENT DEVICE, MEASUREMENT SYSTEM, AND MEASUREMENT METHOD

(71) Applicant: Kioxia Corporation, Tokyo (JP)

(72) Inventors: Yuki Abe, Kuwana (JP); Akira Hamaguchi, Yokkaichi (JP); Takaki Hashimoto, Yokohama (JP); Kazuhiro Nojima, Mie (JP); Kaori Fumita, Yokkaichi (JP)

(73) Assignee: Kioxia Corporation, Tokyo (JP)

( * ) Notice: Subject to any disclaimer, the term of this patent is extended or adjusted under 35 U.S.C. 154(b) by 128 days.

(21) Appl. No.: 18/600,451

(22) Filed: Mar. 8, 2024

(65) Prior Publication Data

US 2024/0210334 A1      Jun. 27, 2024

(51) Int. Cl.
| | |
|---|---|
| *G01N 23/201* | (2018.01) |
| *G01N 21/47* | (2006.01) |
| *G01N 21/95* | (2006.01) |
| *G01N 23/207* | (2018.01) |

(52) U.S. Cl.
CPC ....... *G01N 23/201* (2013.01); *G01N 21/4788* (2013.01); *G01N 21/9501* (2013.01); *G01N 23/207* (2013.01)

(58) Field of Classification Search
CPC ........... G01N 21/4788; G01N 21/9501; G01N 2223/611; G01N 23/201; G01N 23/207; G01N 23/20; G01N 23/2055; G01N 23/2008; G01N 2223/056; G01N 2223/1016; G01N 2223/304; G01N 2223/0566; G01N 2223/405; G01B 2210/56
See application file for complete search history.

(56) References Cited

U.S. PATENT DOCUMENTS

| | | | |
|---|---|---|---|
| 6,556,652 B1 * | 4/2003 | Mazor ................. | G01N 23/201 378/71 |
| 10,883,924 B2 * | 1/2021 | O'Mullane et al. . | G01N 21/211 |
| 2011/0114951 A1 * | 5/2011 | Kamikubo ............ | G01B 11/06 257/E23.179 |
| 2014/0177801 A1 * | 6/2014 | Lee .......................... | G21K 1/06 378/71 |
| 2015/0012239 A1 * | 1/2015 | Ishibashi ................. | G01N 9/24 702/137 |

(Continued)

FOREIGN PATENT DOCUMENTS

JP      2022-038389 A      3/2022

*Primary Examiner* — David J Makiya
*Assistant Examiner* — Soorena Kefayati
(74) *Attorney, Agent, or Firm* — Foley & Lardner LLP

(57)      ABSTRACT

A measurement device includes an X-ray irradiation section; an X-ray detection section configured to detect scattered X-rays generated from an object; and an analysis section configured to analyze diffraction images obtained through photoelectric conversion of the scattered X-rays and estimate a three-dimensional shape of the object. A recessed portion is formed in a first film from an opening portion in a second film formed on the first film. The analysis section estimates a three-dimensional shape of the object on the basis of the diffraction images acquired while an irradiation angle of the X-rays with respect to the object is changed and shape data obtained by measuring the object in advance. The shape data includes a film thickness of the second film, a neck diameter, and a bottom diameter.

20 Claims, 31 Drawing Sheets

(56) References Cited

U.S. PATENT DOCUMENTS

| | | | | |
|---|---|---|---|---|
| 2015/0046121 A1* | 2/2015 | Dziura | G01N 21/956 | |
| | | | 702/179 | |
| 2015/0051877 A1* | 2/2015 | Bakeman | G01N 23/223 | |
| | | | 703/1 | |
| 2015/0323316 A1* | 11/2015 | Shchegrov | G01B 11/27 | |
| | | | 702/150 | |
| 2018/0224749 A1* | 8/2018 | Measor | G03F 7/7065 | |
| 2018/0299259 A1* | 10/2018 | Shchegrov | G01B 11/14 | |
| 2019/0017946 A1* | 1/2019 | Wack | G01N 23/201 | |
| 2019/0033236 A1* | 1/2019 | Barak | G01N 23/2055 | |
| 2019/0049602 A1* | 2/2019 | Hench | G01N 23/201 | |
| 2019/0325635 A1* | 10/2019 | Meyer | G01N 23/207 | |
| 2019/0354024 A1* | 11/2019 | Tsiatmas | G03F 7/7065 | |
| 2020/0082523 A1* | 3/2020 | Leung | G06T 7/0004 | |
| 2020/0292467 A1* | 9/2020 | Malkova | G01B 11/0625 | |
| 2021/0080409 A1* | 3/2021 | Wang | G01N 23/201 | |
| 2021/0310968 A1* | 10/2021 | Kuznetsov | G01B 15/02 | |
| 2021/0341397 A1* | 11/2021 | Ginsburg | G01N 23/201 | |
| 2022/0068678 A1 | 3/2022 | Tanizaki | | |
| 2023/0055116 A1* | 2/2023 | Kochersperger | G03F 7/7065 | |

* cited by examiner

211

7

232

MEASUREMENT DEVICE, MEASUREMENT SYSTEM, AND MEASUREMENT METHOD

CROSS-REFERENCE TO RELATED APPLICATION

This application is based upon and claims the benefit of priority from the prior Japanese Patent Application No. 2023-038393 filed on Mar. 13, 2023; the entire contents of which are incorporated herein by reference.

FIELD

Embodiments described herein relate to a measurement device, a measurement system, and a measurement method.

BACKGROUND

As a device that measures a depth of a recessed portion (a deep hole, a deep groove) and a three-dimensional shape of a side wall formed in a film on a semiconductor substrate, a measurement device using a transmission small angle X-ray scattering (hereinafter, referred to as T-SAXS) is known.

DETAILED DESCRIPTION

A measurement device according to the present embodiment includes: an X-ray irradiation section configured to irradiate an object with X-rays; an X-ray detection section configured to detect scattered X-rays emitted from the object through the irradiation of the X-rays; and an analysis section configured to analyze a plurality of diffraction images obtained through photoelectric conversion of the scattered X-rays and estimate a three-dimensional shape of a measurement region of the object irradiated with the X-rays.

A first film and a second film formed of a material that is different from a material of the first film are stacked in the measurement region of the object, and a recessed portion that penetrates through the second film and reaches inside of the first film is formed at a part of the measurement region.

The analysis section estimates a three-dimensional shape of the recessed portion on the basis of the plurality of diffraction images acquired while an irradiation angle of the X-rays with respect to the object is changed and shape data obtained by measuring the object in advance.

The shape data includes a film thickness of the second film, a minimum dimension of the recessed portion inside the second film, and a dimension of the recessed portion at an interface between the first film and the second film.

Hereinafter, embodiments will be described with reference to the drawings.

First Embodiment

Figure 1:
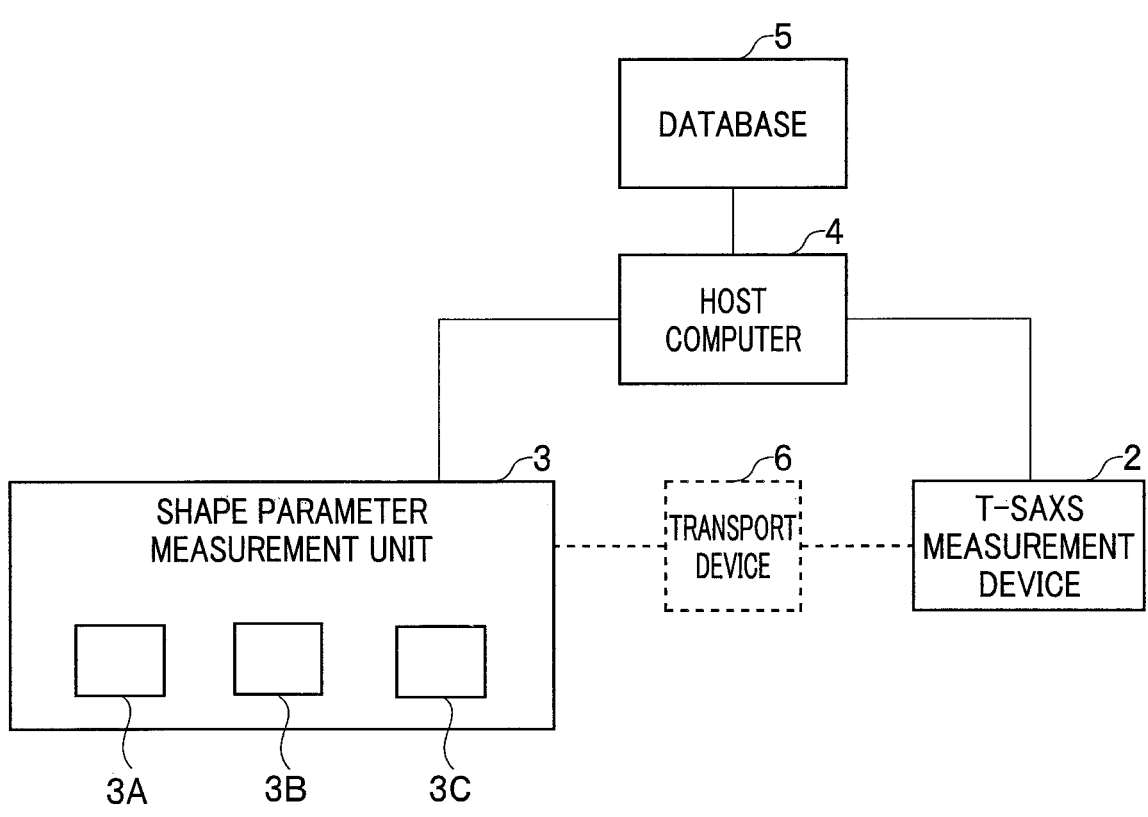
FIG. 1 is a block diagram illustrating a configuration example of a measurement system including a measurement device according to a first embodiment.

FIG. 1 is a block diagram illustrating a configuration example of a measurement system including a measurement device according to a first embodiment. A measurement system 1 according to the present embodiment includes a T-SAXS measurement device 2, a shape parameter measurement unit 3, a host computer 4, and a database 5. The measurement system 1 may include a transport device 6 that transports an object between the T-SAXS measurement device 2 and the shape parameter measurement unit 3. The measurement system 1 according to the embodiment is used to measure a three-dimensional shape of a cyclic pattern formed on a surface of the object, for example. More specifically, the measurement system 1 according to the embodiment is used to acquire a shape profile including a depth of a recessed portion (a hole, a groove, or the like) and a thickness of a film formed in the object.

Figure 2:
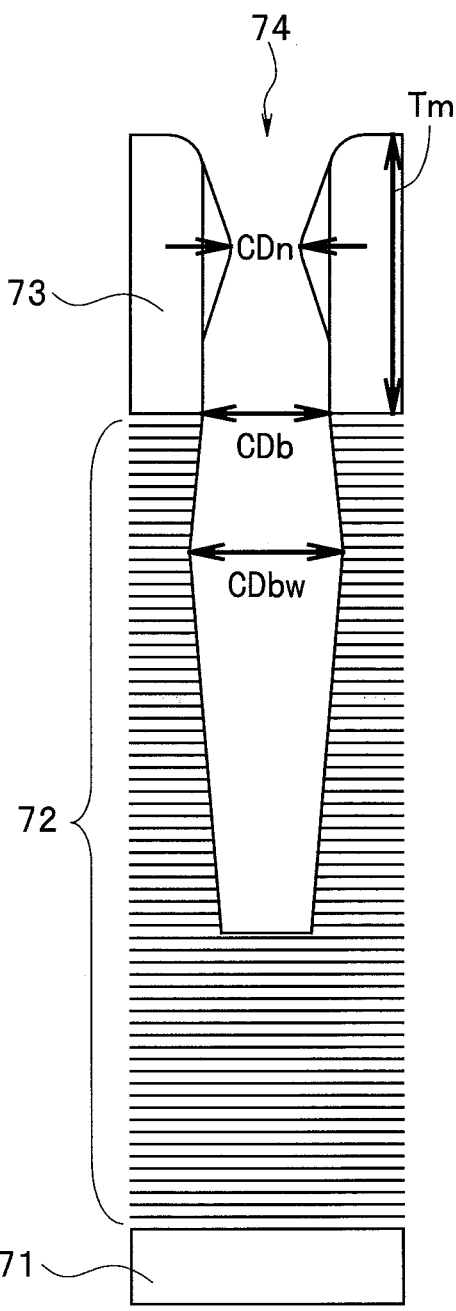
FIG. 2 is a sectional view for explaining an example of a structure of an object.

FIG. 2 is a sectional view for explaining an example of a structure of the object. As illustrated in FIG. 2, an ON stacked film 72 as a first film and an etching mask film 73 as a second film are stacked on a surface of a semiconductor substrate 71 in the object. The ON stacked film 72 is a film in which silicon oxide films and silicon nitride films are alternately deposited. In FIG. 2, solid lines correspond to the silicon nitride films, and blanks that are adjacent to the solid lines correspond to the silicon oxide films. The etching mask film 73 is an amorphous carbon film, for example. A hole 74 is formed in a partial region of the object from a surface of the etching mask film 73 to a predetermined depth of the ON stacked film 72. In other words, the hole 74 penetrates through the etching mask film 73 and reaches inside of the ON stacked film 72. Note that in FIG. 2, a film thickness of the etching mask film 73 is indicated as Tm, a minimum diameter (hereinafter, referred to as a neck diameter) of the hole 74 inside the etching mask film 73 is indicated as CDn, a diameter (hereinafter, referred to as a bottom diameter) of the hole 74 at an interface between the etching mask film 73 and the ON stacked film 72 is indicated as CDb, and a maximum diameter (hereinafter, referred to as a bow diameter) of the hole 74 inside the ON stacked film 72 is indicated as CDbw.

The T-SAXS measurement device 2 measures a three-dimensional shape of a cyclic pattern formed on the surface of the object by using transmitted X-rays. It is possible to measure an average three-dimensional shape of the cyclic pattern formed inside a spot size (of about a square with a side of 50 to 1000 μm, for example) by using a plurality of diffraction images (SAXS image group) acquired by changing an incident angle of the X-rays on the object.

Figure 3:
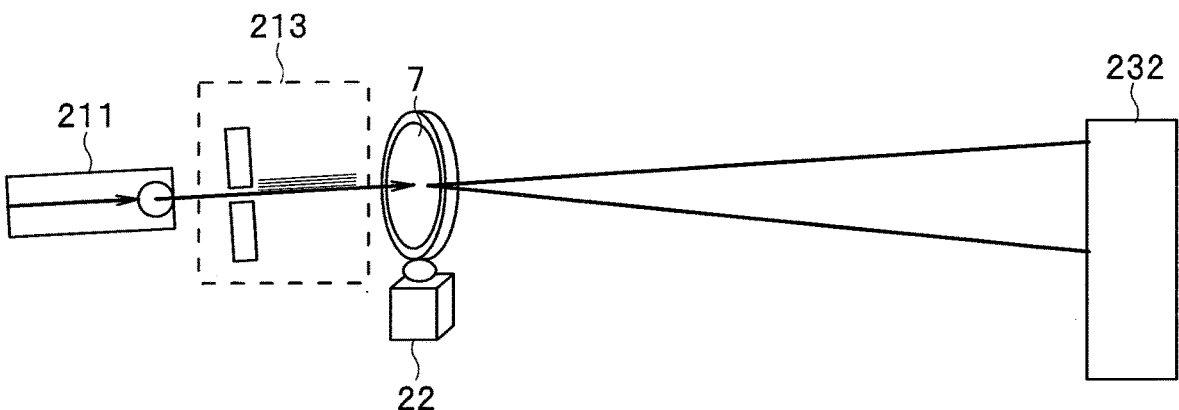
FIG. 3 is a schematic view for explaining an example of a configuration of a T-SAXS measurement device.
Figure 4:
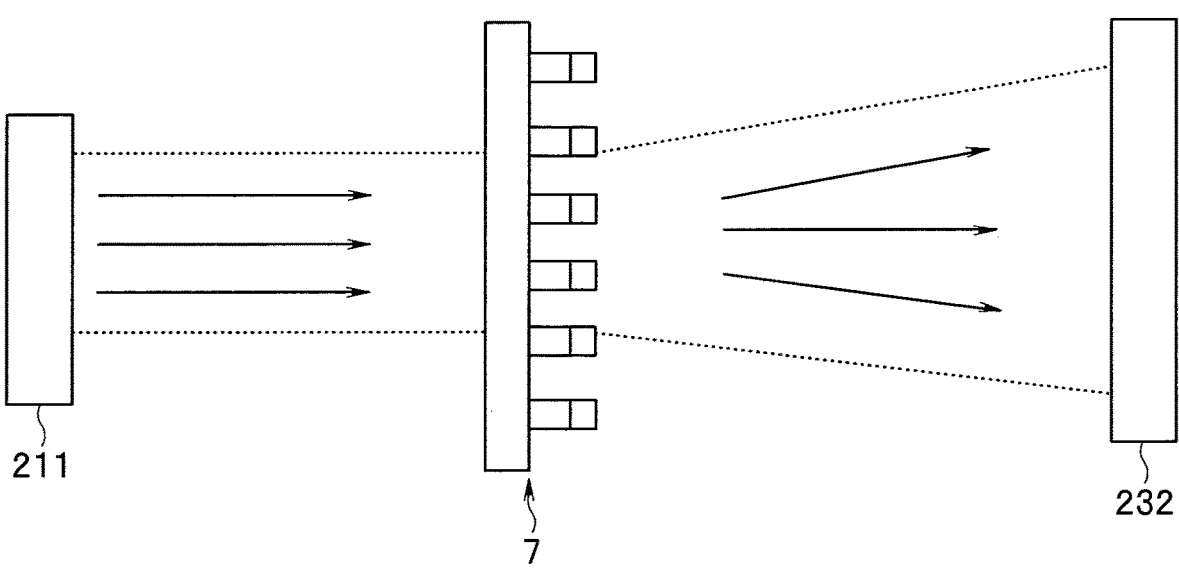
FIG. 4 is a schematic view for explaining an example of the configuration of the T-SAXS measurement device.
Figure 5:
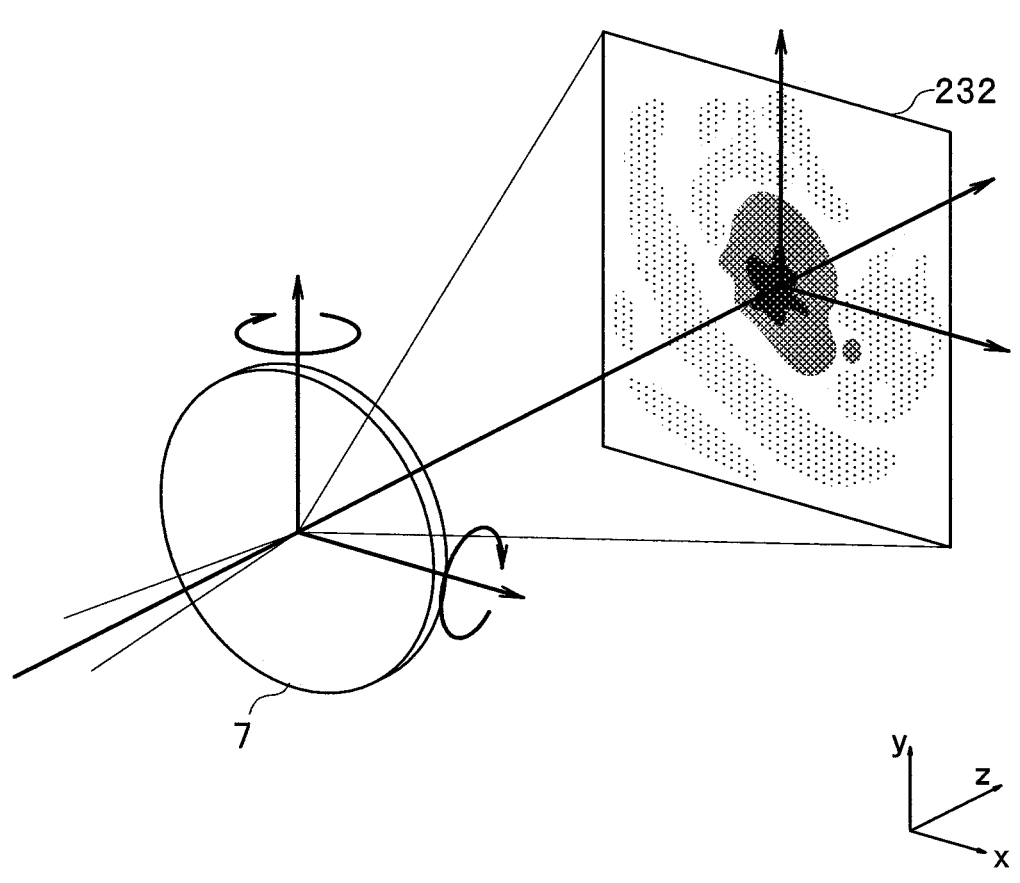
FIG. 5 is a schematic view for explaining an example of the configuration of the T-SAXS measurement device.

FIGS. 3 to 5 are schematic diagrams for explaining an example of a configuration of the T-SAXS measurement device. As illustrated in FIG. 3, the T-SAXS measurement device 2 causes beam spots of X-rays emitted from an X-ray source 211 to converge by an X-ray convergence mechanism 213 and irradiates a surface of an object (semiconductor wafer) 7 held by a measurement stage 22.

As illustrated in FIG. 4, the X-rays with which the object 7 has been irradiated are scattered by a pattern formed on the surface of the object 7. The scattered X-rays are detected by a detector 232 disposed on a rear surface side of the object 7 and are converted into signals (diffraction images) indicating characteristics of the object 7.

Figure 6:
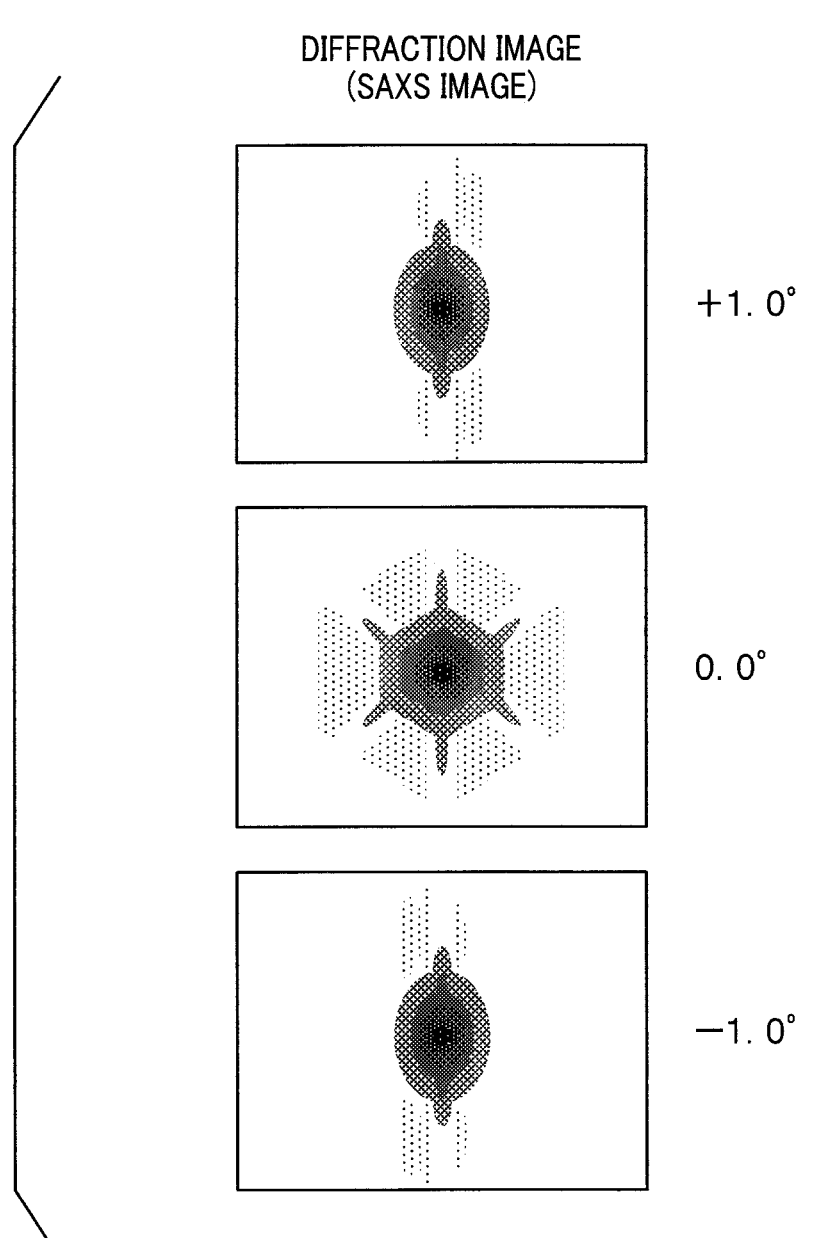
FIG. 6 is a diagram for explaining a relationship between an X-ray irradiation angle and a diffraction image.

As illustrated in FIG. 5, the object 7 is installed such that the object 7 can rotate with any one of or both two directions (an x direction and a y direction) that are parallel to the object surface and perpendicularly intersect each other used as a rotation axis. Note that in a case where the object 7 has the structure illustrated in FIG. 2, the surface of the semiconductor substrate 71 is regarded as the object surface. It is possible to adjust an irradiation angle $\theta i$ of the X-rays with respect to the object 7 by irradiating the object 7 with the X-rays in a state where the object 7 is caused to rotate about the set rotation axis. The T-SAXS measurement device 2 acquires a plurality of diffraction images (diffraction image group) while causing the irradiation angle $\theta i$ to change little by little. FIG. 6 is a diagram for explaining a relationship between the irradiation angle of the X-rays and the diffraction images. FIG. 6 illustrates three diffraction images of different irradiation angles. In FIG. 6, the irradiation angle $\theta i$ is illustrated on the right side of each diffraction image. The acquired diffraction image group is compared with a plurality of diffraction image groups calculated by simulating intensity distribution of X-ray diffraction light corresponding to various three-dimensional shape patterns. A diffraction image group with a high matching level is extracted from the plurality of diffraction image groups, and a three-dimensional shape pattern corresponding to the diffraction image group is estimated as a three-dimensional shape formed on the surface of the object 7 in the region irradiated with the X-rays. Note that the irradiation direction of the X-rays may be a direction perpendicularly intersecting a vertical direction or may be the vertical direction. In a case where the object 7 is installed with the surface of the object 7 being parallel to the vertical direction in a state where the object 7 is not allowed to rotate, the irradiation direction of the X-rays is the direction perpendicularly intersecting the vertical direction. In a case where the object 7 is installed with the surface of the object 7 being perpendicular to the vertical direction in the state where the object 7 is not allowed to rotate, the irradiation direction of the X-rays is the vertical direction.

Figure 7:
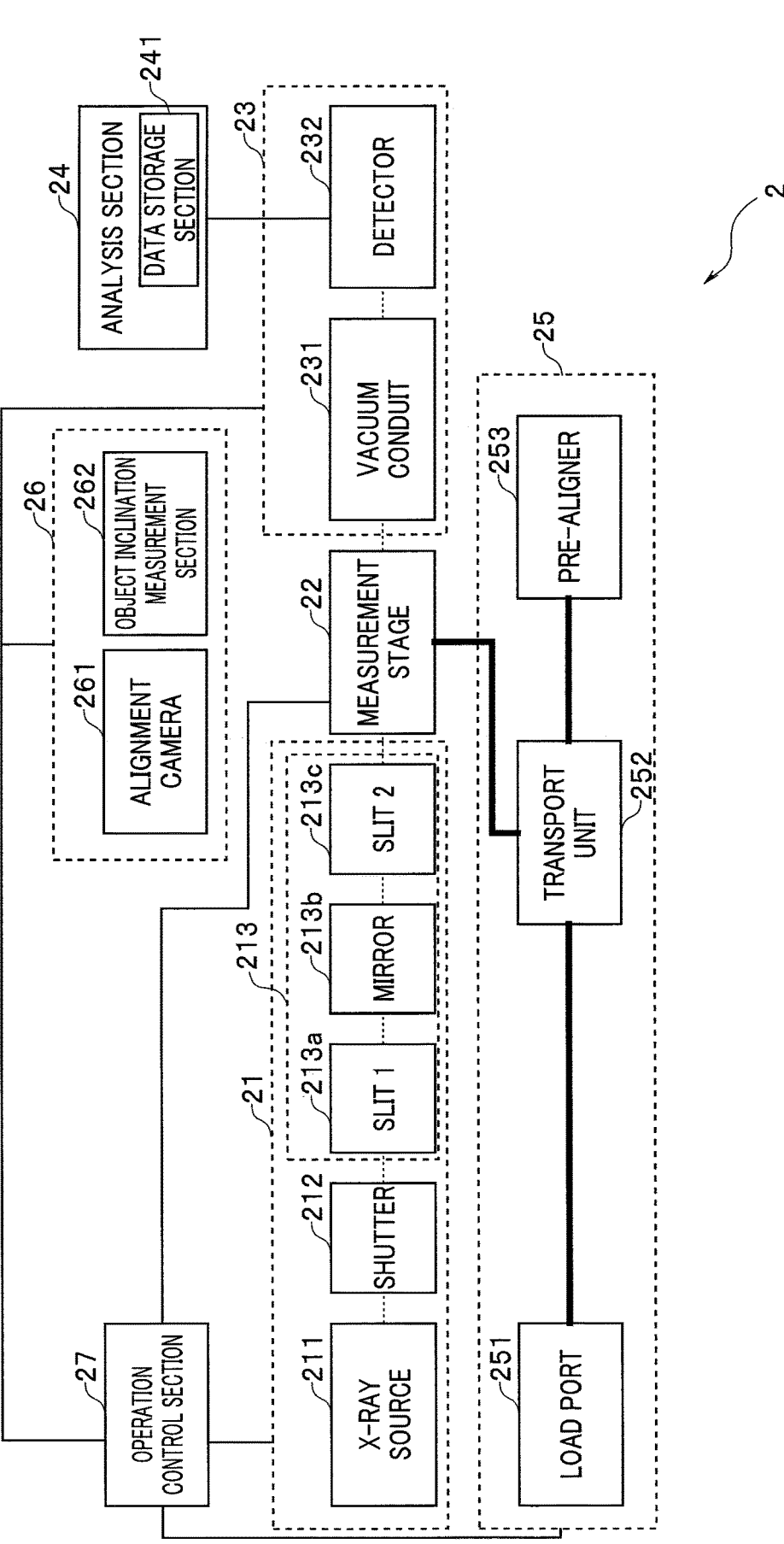
FIG. 7 is a block diagram for explaining an example of the configuration of the T-SAXS measurement device.

FIG. 7 is a schematic block diagram for explaining an example of the configuration of the T-SAXS measurement device. The T-SAXS measurement device 2 includes an X-ray irradiation section 21, a measurement stage 22, an X-ray detection section 23, and an analysis section 24. Also, the T-SAXS measurement device 2 includes a transport section 25, a position measurement section 26, and an operation control section 27. Note that in FIG. 7, thick lines indicate transport paths of the object 7. Also, dashed lines indicate optical paths of the irradiation light and the diffraction light. Solid lines indicate signal transmission paths through which data and information (electric signals) are transmitted.

The X-ray irradiation section 21 is configured mainly of the X-ray source 211, a shutter 212, and the X-ray convergence mechanism 213. The X-ray source 211 is a site where X-rays with predetermined wavelengths and energy are generated. The X-ray sources 211 is configured as an electron beam source configured to excite the X-rays through particle irradiation of a sold or liquid target, for example. The shutter 212 is installed between the measurement stage 22 and the X-ray source 211. The shutter 212 can perform opening and closing operations and is controlled by the operation control section 27. In a case where the shutter 212 is in an opened state, the measurement stage 22 is irradiated with the X-rays emitted from the X-ray source 211. In a case where the shutter 212 is in a closed state, the optical path of the X-rays is blocked, and the measurement stage 22 is thus not irradiated with the X-rays.

The X-ray convergence mechanism 213 is configured mainly of a first slit 213a, a mirror 213b, and a second slit 213c. The X-ray convergence mechanism 213 is installed between the shutter 212 and the measurement stage 22. The first slit 213a is used to limit angular spreading of the emitted X-rays. The mirror 213b causes the emitted X-rays to converge and reduces a beam size. The second slit 213c is disposed in proximity to the measurement stage 22 and further narrows down the beam size of the emitted X-rays. In other words, the X-ray convergence mechanism 213 is provided to prevent the object 7 from being irradiated with scattered beams of the emitted X-rays and narrow down an X-ray irradiation range on the object 7. The measurement region of the object 7 installed on the measurement stage 22 is irradiated with the X-rays narrowed down by the X-ray convergence mechanism 213.

The measurement stage 22 is a member that supports the object 7 such that the object 7 can rotate with the x direction and/or the y direction used as a rotation axis. The measurement stage 22 is configured of, for example, a support shaft configured of a tubular or rod-shaped member and a chuck which is a hollow ring-shaped member. The chuck is rotatably engaged with one end of the support shaft.

Also, the measurement stage 22 is adapted to be movable in the x direction and/or the y direction and in a direction (z direction) perpendicularly intersecting the x direction and the y direction by drive means such as a motor, which is not illustrated. It is possible to cause the X-ray irradiation region on the object 7 to move by causing the measurement stage 22 to move in the x direction and/or the y direction. Also, it is possible to change focusing of the diffraction image of the object 7 detected by the X-ray detection section 23 by causing the measurement stage 22 to move in the z direction.

The X-ray detection section 23 is configured mainly of a vacuum conduit 231 and a detector 232. The vacuum conduit 231 is a columnar member with inside kept in a vacuum state and is disposed between the measurement stage 22 and the detector 232. The diffraction X-rays generated from the object 7 held by the measurement stage 22 are incident on inside of the vacuum conduit 231 from one end surface of the vacuum conduit 231, passes through the inside of the vacuum conduit 231, and is emitted from the other end surface of the vacuum conduit 231 toward the detector 232. The vacuum conduit 231 is provided to prevent the diffraction X-rays from being affected by disturbance due to an environment (such as air disturbance) and prevent noise from being superimposed on the diffraction images.

The detector 232 receives light of the diffraction X-rays generated from the object 7 and generates diffraction images. The detector 232 is configured of a plurality of semiconductor detection elements (solid imaging elements or the like) disposed in a two-dimensional array shape, for example. As the semiconductor detection elements, CCDs (charge coupled devices) or CMOS image sensors, for example, are used. The diffraction X-rays generated by the irradiation X-rays in the measurement region on the object 7 are subjected to photoelectric conversion by the semiconductor detection elements disposed in a projection region of the detector 232 and are outputted as imaging signals (diffraction images).

The analysis section 24 compares a diffraction image group (a plurality of diffraction images acquired by changing a rotation angle of the object 7) outputted from the detector 232 with diffraction image groups calculated by simulating intensity distribution of X-ray diffraction light corresponding to various three-dimensional shape patterns in advance. A diffraction image group with a high matching level is extracted from the plurality of diffraction image groups, and a three-dimensional shape pattern corresponding to the diffraction image group is estimated to be a three-dimensional shape formed on the surface of the object 7. Also, it is possible to acquire shape parameters measured by the shape parameter measurement unit 3 via the host computer 4 and to estimate the three-dimensional shape by using the shape parameters as well. The analysis section 24 includes a data storage section 241 capable of storing the plurality of diffraction image groups calculated through simulation and the shape parameters measured by the shape parameter measurement unit 3.

The transport section 25 includes a load port 251, a transport unit 252, and a pre-aligner 253. The load port 251 is an inlet section provided to insert the object 7 into the T-SAXS measurement device 2. The transport unit 252 is a site that automatically transports the object 7 to each site inside the T-SAXS measurement device 2. The pre-aligner 253 aligns a reference position (for example, a notch, an orientation flat, or an alignment mark) provided on the object 7 at a desired position when the object 7 is installed on the measurement stage 22.

In a case where the object 7 is set on the measurement stage 22 of the T-SAXS measurement device 2, the transport section 25 operates as follows. Once a container accommodating the object 7 is installed at the load port 251, the transport unit 252 picks up the object 7 from the container and causes the object 7 to move to the pre-aligner 253. After the pre-aligner 253 performs positioning of the object 7 in the x direction and the y direction and positioning of the rotation direction around a center of the object 7 as an axis in an xy plane, the transport unit 252 picks up the object 7 again and installs the object 7 on the measurement stage 22. Also, when acquisition of the diffraction image group ends and the object 7 is picked up from the T-SAXS measurement device 2, the transport unit 252 picks up the object 7 from the measurement stage 22 and causes the object 7 to move to the inside of the container installed at the load port 251. The aforementioned operations of the transport section 25 are controlled by the operation control section 27.

The position measurement section 26 includes an alignment camera 261 and an object inclination measurement section 262. The alignment camera 261 detects an amount of deviation (an amount of deviation in the xy plane) between a set measurement position (the position where it is desired to perform X-ray irradiation) and an X-ray irradiation position (the position where irradiation with the X-rays is performed). The detected amount of deviation is outputted to the operation control section 27. The object inclination measurement section 262 measures an angle of the surface at the measurement position of the object 7 installed on the measurement stage 22.

The operation control section 27 controls operations of each site of the T-SAXS measurement device 2. The operation control section 27 provides instructions of various parameter used for irradiation and detection of the X-rays to the X-ray irradiation section 21 and the X-ray detection section 23, for example. Also, the measurement stage 22 is caused to move in the xy plane, and the position of the measurement stage 22 is controlled such that the set measurement position is irradiated with the X-rays, for example. Furthermore, instructions of a rotation angle and a rotation direction of the measurement stage 22 are also provided. Moreover, instructions of operations of the transport section 25 are provided.

Returning to FIG. 1, the shape parameter measurement unit 3 measures shape parameters on the basis of the three-dimensional shape formed on the surface of the object 7. Specifically, shape parameters (with large deviation between measured values and actually measured values) that are difficult to be measured by the T-SAXS measurement device 2 are measured. The shape parameters measured by the shape parameter measurement unit 3 include at least three shape parameters, namely the film thickness Tm of the etching mask film 73, the minimum diameter CDn of the hole 74 inside the etching mask film 73, and the diameter CDb of the hole 74 at the interface between the etching mask film 73 and the ON stacked film 72 in the structure of the object 7 illustrated in FIG. 2. The shape parameter measurement unit 3 is equipped with a measurement device capable of measuring the shape parameters as measurement targets with higher accuracy than the T-SAXS measurement device 2.

For example, the shape parameter measurement unit 3 is equipped with a first multi-wavelength optical measurement device using infrared rays, as a film thickness measurement section 3A that measures the film thickness Tm. Also, the shape parameter measurement unit 3 is equipped with an electron beam measurement device as a neck diameter measurement section 3B that measures the neck diameter CDn. Furthermore, the shape parameter measurement unit 3 is equipped with a second multi-wavelength optical measurement device using infrared rays, as a bottom diameter measurement section 3C that measures the bottom diameter CDb.

The first multi-wavelength optical measurement device is a measurement device using an OCD (optical critical dimension) method, irradiates the object 7 with light at a predetermined incident angle, and acquires spectral characteristics of diffraction light. The irradiation light is multi-wavelength light in a mid-infrared region of a wavelength of about 20 µm or less, for example.

Figure 8:
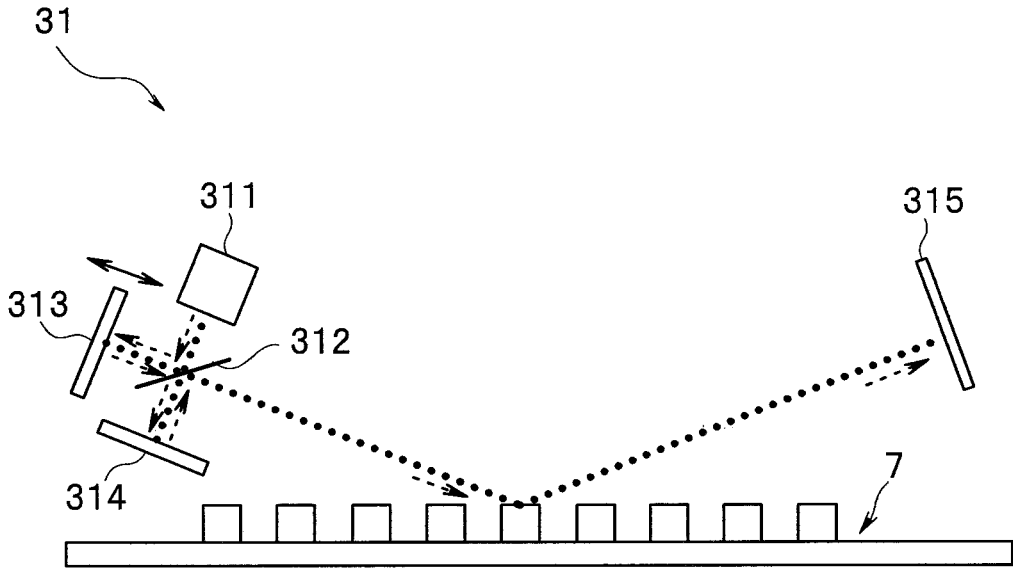
FIG. 8 is a diagram for explaining an example of a measurement principle of a first multi-wavelength optical measurement device.

FIG. 8 is a diagram for explaining an example of a measurement principle of the first multi-wavelength optical measurement device. FIG. 8 illustrates a measurement device using an infrared ray ellipsometry scheme as an example of the first multi-wavelength optical measurement device 31. As illustrated in FIG. 8, infrared light (light in a wavelength band of a wavelength of about 20 µm or less, for example) emitted from a multi-wavelength light source 311 is split into two directions by a beam splitter 312. One light flux (first light flux) of the two split light fluxes is reflected by a mirror 313. The other light flux (second light flux) is reflected by a mirror 314. The two reflected light fluxes return to the beam splitter 312, optical axes become the same, and the light fluxes interfere with each other and are then synthesized into irradiation light with a predetermined wavelength. The mirror 313 has a variable distance from the beam splitter 312, and a phase difference between a phase of the second light flux and a phase of the first light flux changes by causing the distance to change. It is thus possible to adjust the wavelength of the light synthesized by the first light flux and the second light flux interfering with each other. The irradiation light with the adjusted wavelength is obliquely incident on the object 7. Reflected light from the object 7 is converted into a signal (diffraction light intensity spectrum) indicating characteristics of the object 7 by a detector 315. The wavelength of the irradiation light with which the object 7 is to be irradiated is caused to change by changing the distance between the mirror 313 and the beam splitter 312, and diffraction light intensity spectra with different wavelengths are measured in a time-division manner.

On the other hand, diffraction light intensity spectra corresponding to various film structures and three-dimensional shape patterns are calculated through simulation using an EMA (effective medium approximation) method, and a spectral characteristic library is created in advance. Note that in the EMA method, the spectral characteristic library is created on the basis of a simple model that approximates the stacked structure of the film in the object 7. The spectral characteristics of the diffraction light are compared with the spectral characteristic library, and a spectrum with a high matching level is extracted. A three-dimensional shape pattern and a film structure corresponding to the extracted spectrum are estimated to be a three-dimensional shape and a film structure of the cyclic pattern formed inside the spot size of the irradiation light, and a film thickness of the uppermost layer film is outputted as the film thickness Tm.

A difference between electron density of the amorphous carbon film configuring the etching mask film 73 and electron density of the silicon oxide film and the silicon nitride film configuring the ON stacked film 72 is small. In a case where the T-SAXS measurement device 2 is used, X-ray scattering at the interface between the etching mask film 73 and the ON stacked film 72 is weak, and it is difficult to individually identify films with small differences in electron density. On the contrary, the first multi-wavelength optical measurement device 31 performs irradiation with mid-infrared light with a wavelength longer than the wavelength of the X-rays, and it is thus possible to individually identify a plurality of films with small differences in electron density (for example, between the silicon substrate and the silicon oxide film and between the amorphous carbon film and the silicon oxide film). Therefore, it is possible to measure the film thickness Tm of the etching mask film 73 with a higher accuracy than the T-SAXS measurement device 2.

Figure 9:
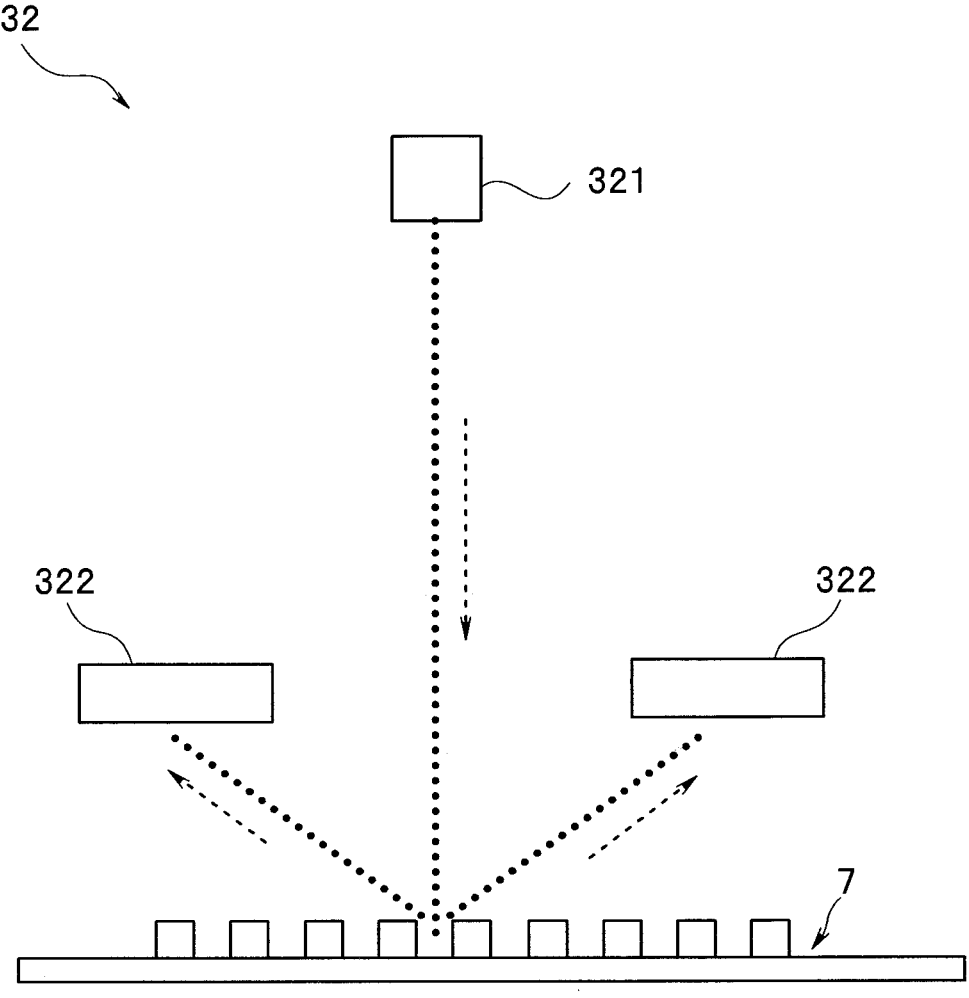
FIG. 9 is a diagram for explaining an example of a measurement principle of an electron beam measurement device.

The electron beam measurement device is a device that causes an electron beam to hit a sample and observes the surface of the object 7. For example, the electron beam measurement device is a CD-SEM (critical dimension-scanning electron microscope). FIG. 9 is a diagram for explaining an example of a measurement principle of the electron beam measurement device. As illustrated in FIG. 9, an electron beam emitted from an electron gun 321 is accelerated and is then collected as an electron spot on the surface of the object 7. BSEs (back scattered electrons) in a low angle direction released from the surface of the object 7 are incident on a detector 322 with an annular shape. The detector 322 detects the back scattered electrons, converts an amount of the back scattered electrons into an optical signal, and outputs the optical signal. The detector 322 detects the amount of back scattered electrons at each irradiation position while causing the irradiation position on the object 7 to move by a scanning coil or the like, which is not illustrated (electron beam scanning).

It is a BSE image that indicates the amount of back scattered electrons as brightness at each irradiation position. Since the amount of generated back scattered electrons changes due to an uneven structure on the surface of the object 7, a surface form of the object 7 appears in the BSE image. A line profile (a change in brightness) on a line crossing a diameter of a hole is extracted in the BSE image. Predetermined arithmetic processing is performed on the line profile to calculate the neck diameter CDn, and the neck diameter CDn is then outputted.

X-rays are unlikely to be transmitted through a neck part of the etching mask film 73 where the diameter of the hole 74 is minimum. Therefore, X-ray scattering from the object 7 is weak, and it is difficult to obtain a sufficient diffraction light intensity. Therefore, there has been a case where the T-SAXS measurement device 2 erroneously detects that the neck part is blocked. On the contrary, the electron beam measurement device 32 illustrated in FIG. 9 measures back scattered electrons that are sensitive to the uneven shape on the surface of the object 7 and calculates the neck diameter CDn from the BSE image. Therefore, it is possible to measure the neck diameter CDn with higher accuracy than the T-SAXS measurement device 2.

Figure 10:
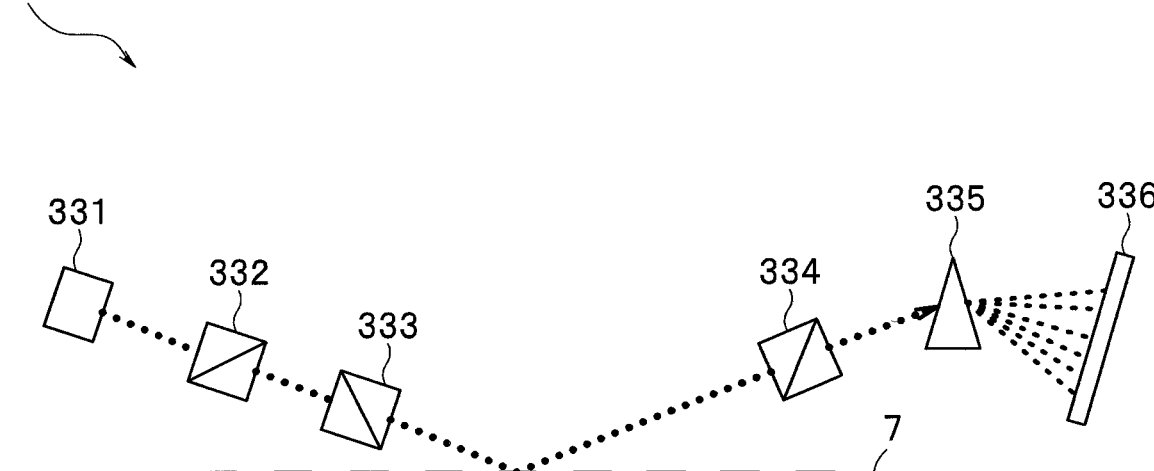
FIG. 10 is a diagram for explaining an example of a measurement principle of a second multi-wavelength optical measurement device.

The second multi-wavelength optical measurement device is a measurement device using the OCD method, irradiates the object 7 with light at a predetermined incident angle, and acquires spectral characteristics of diffraction light. The irradiation light is, for example, multi-wavelength light in a mid-infrared region of a wavelength of about 11 μm or less. FIG. 10 is a diagram for explaining an example of a measurement principle of the second multi-wavelength optical measurement device.

As illustrated in FIG. 10, the second multi-wavelength optical measurement device 33 adjusts a polarization state of multi-wavelength light (white light, for example) emitted from a multi-wavelength light source 331 by a polarizer (polarization element) 332 and a compensator (compensation element) 333, and the multi-wavelength light is caused to be obliquely incident on the surface of the object 7. A polarization state and a reflection intensity of the multi-wavelength light with which the object 7 has been irradiated are changed for each wavelength by the film structure of the pattern formed on the surface of the object 7. A polarization state of diffraction light reflected from the object 7 is adjusted by an analyzer (light analysis element) 334, and wavelength resolution is then performed by a prism 335. In other words, the prism 335 disperses the transmitted diffraction light depending on the wavelength. The dispersed diffraction light is converted into a signal (diffraction light intensity spectrum) in accordance with a light amount by a detector 336.

On the other hand, diffraction light intensity spectra corresponding to various three-dimensional shape patterns and film structures are calculated through simulation using RCWA (rigorous couple-wave analysis) method, and a spectral characteristic library is created in advance. The acquired diffraction light intensity spectrum is compared with the spectral characteristic library, and a spectrum with a high matching level is extracted. A three-dimensional shape pattern and a film structure corresponding to the extracted spectrum are estimated to be a three-dimensional shape and a film structure of the cyclic pattern formed inside the spot size of the irradiation light, and a diameter at an interface between the uppermost layer film and the film right below the uppermost layer film is outputted as the bottom diameter CDb.

The second multi-wavelength optical measurement device 33 performs irradiation with mid-infrared light, and it is thus possible to individually identify a plurality of films with small differences in electron density (for example, between the silicon substrate and the silicon oxide film and between the amorphous carbon film and the silicon oxide film). Therefore, the position of the interface can be measured with high accuracy. Also, the second multi-wavelength optical measurement device 33 uses the spectral characteristic library created by the RCWA method and can estimate the three-dimensional shape with higher accuracy than in a case where the simple spectral characteristic library created by the EMA method is used. Therefore, it is possible to measure the bottom diameter CDb with higher accuracy than the T-SAXS measurement device 2 and the first multi-wavelength optical measurement device.

Note that the devices that measure the film thickness Tm, the neck diameter CDn, and the bottom diameter CDb in the shape parameter measurement unit 3 are not limited to the aforementioned devices. For example, a laser ultrasonic measurement device may be used as the film thickness measurement section 3A. The laser ultrasonic measurement device measures the film thickness Tm as follows, for example. First, the surface of the object 7 is irradiated with a laser beam (excitation laser), and the vicinity of the surface of the object 7 is caused to instantaneously thermally expand. Then, ultrasonic waves are generated in the vicinity of the surface of the object 7 due to the thermal expansion. The ultrasonic waves are propagated toward the inside of the object 7 and are reflected at the interface of the films. Once the reflected ultrasonic waves reach the surface of the object 7, the surface of the object 7 vibrates. It is possible to calculate the film thickness Tm by detecting the vibration of the surface of the object 7 due to the reflection of the ultrasonic waves and using a time until the detection of the vibration after a start of the irradiation with the excitation laser and a sound speed of a propagation speed of the ultrasonic waves inside the film as a measurement target.

The host computer 4 includes a CPU (central processing unit) and a memory. The host computer 4 inputs shape data outputted from the shape parameter measurement unit 3 to the T-SAXS measurement device 2. In a case where a plurality of shape parameters are outputted from the shape parameter measurement unit 3, the host computer 4 can also extract data (shape data) of a shape parameter designated by a user or the like and input the data to the T-SAXS measurement device 2.

The database 5 stores data inputted from the shape parameter measurement unit 3 to the host computer 4, stores data inputted to the T-SAXS measurement device 2, and stores the three-dimensional shape measured by the T-SAXS measurement device 2. In addition, the database 5 can also store the data inputted to the T-SAXS measurement device 2 and the three-dimensional shape estimated by the data in an associated manner.

Figure 11:
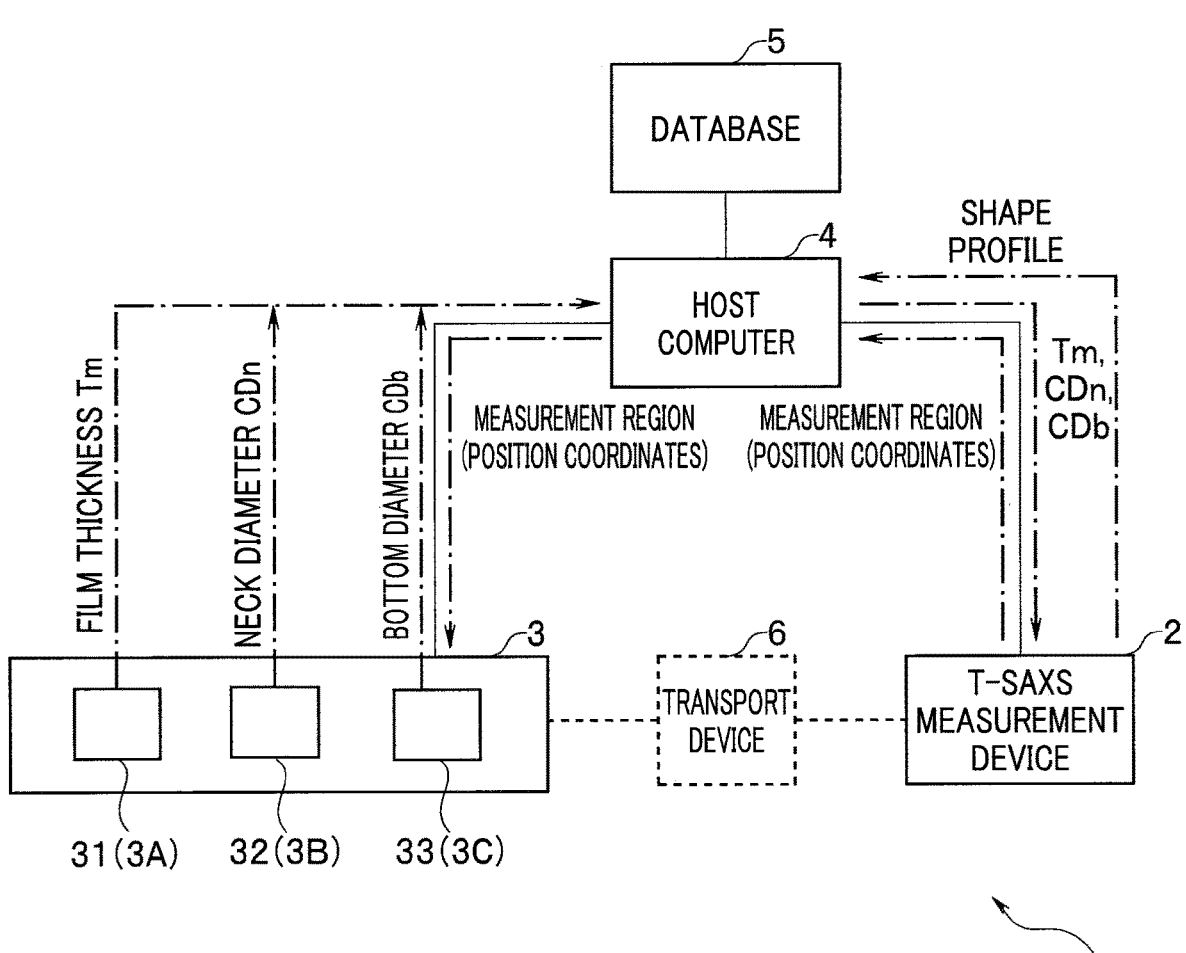
FIG. 11 is a diagram for explaining an example of a flow of data in the measurement system according to the first embodiment.

Next, a three-dimensional shape measurement method of the measurement system according to the first embodiment will be described by using FIGS. 11 and 12. FIG. 11 is a diagram for explaining an example of a flow of data in the measurement system according to the first embodiment. As illustrated in FIG. 11, position coordinates of the measurement region of the object 7 is set by the T-SAXS measurement device 2 and is then inputted to the shape parameter measurement unit 3 via the host computer 4. Note that the position coordinates of the measurement region may be set by the host computer 4 and may be inputted to the T-SAXS measurement device 2 and the shape parameter measurement unit 3 in some cases.

The film thickness Tm is outputted from the first multi-wavelength optical measurement device 31 of the shape parameter measurement unit 3 to the host computer 4. The neck diameter CDn is outputted from the electron beam measurement device 32 of the shape parameter measurement unit 3 to the host computer 4. The bottom diameter CDb is outputted from the second multi-wavelength optical measurement device 33 of the shape parameter measurement unit 3 to the host computer 4. The computer 4 outputs the film thickness Tm, the neck diameter CDn, and the bottom diameter CDb to the T-SAXS measurement device 2.

A shape profile of the measurement region of the object 7 is outputted from the T-SAXS measurement device 2 to the host computer 4. The shape profile is displayed on a display device, which is not illustrated, of the host computer 4 or is outputted to and stored in the database 5.

Figure 12:
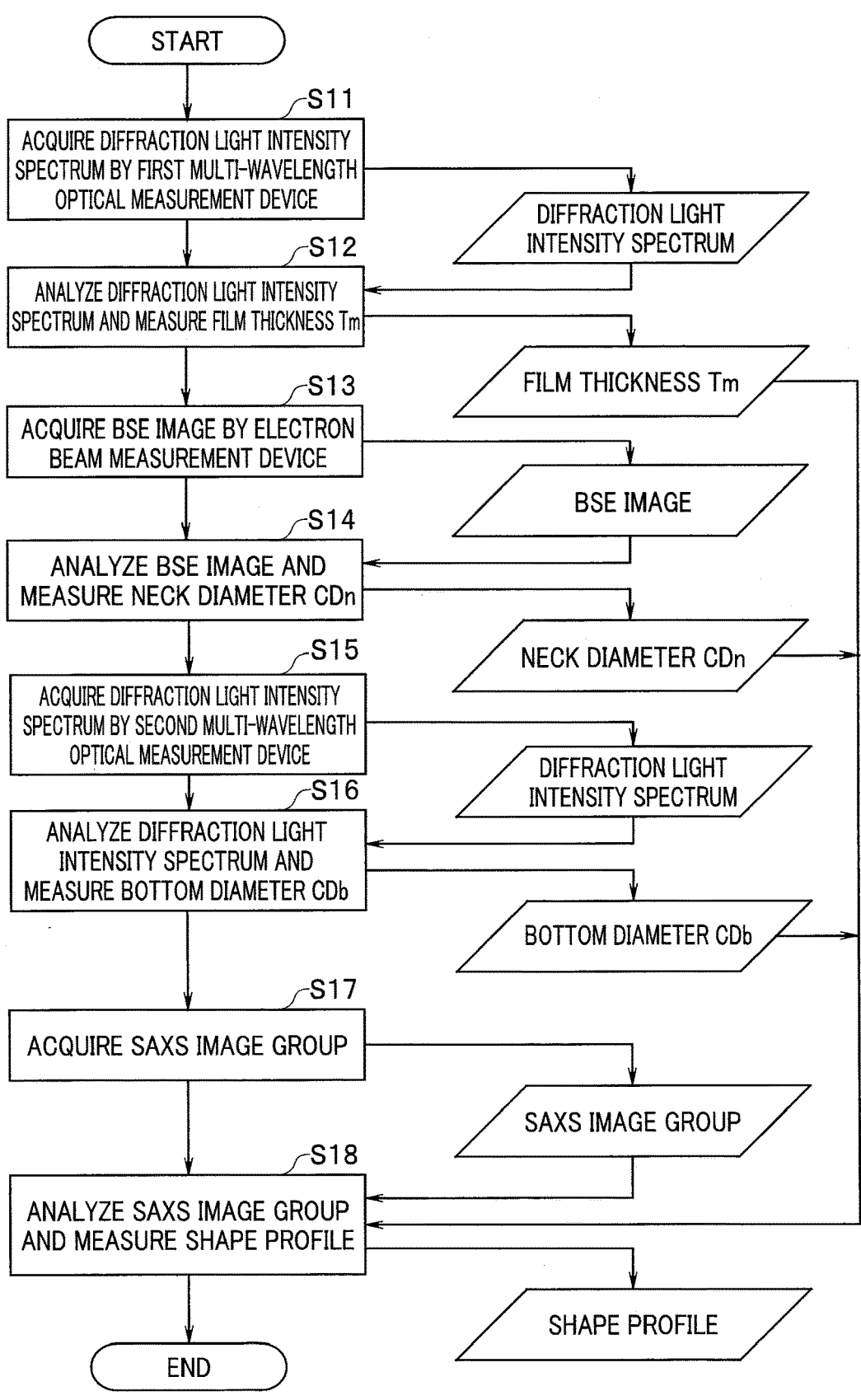
FIG. 12 is a flowchart for explaining an example of a measurement method according to the first embodiment.

FIG. 12 is a flowchart for explaining an example of the measurement method according to the first embodiment. In FIG. 12, rectangles indicate procedures, and parallelograms indicate data. Arrows directed from the rectangles to the parallelograms indicate that the data indicated in the parallelograms is generated (acquired) in a case where the procedures indicated in the rectangles are executed. Also, arrows directed from the parallelograms to the rectangles indicate that the data indicated in the parallelograms is used for the procedures indicated in the rectangles.

First, the shape parameter measurement unit 3 executes a series of following procedure from S11 to S16 and acquires shape parameters. First, the first multi-wavelength optical measurement device 31 is used to acquire a diffraction light intensity spectrum in the measurement region of the object 7 (S11). The diffraction light intensity spectrum acquired in S11 is analyzed, and the film thickness Tm of the etching mask film 73 formed on the surface of the object 7 is measured (S12). Next, the electron beam measurement device 32 is used to acquire a BSE image in the measurement region of the object 7 (S13). The BSE image acquired in S13 is analyzed, and the neck diameter CDn of the etching mask film 73 is measured (S14). Subsequently, the second multi-wavelength optical measurement device 33 is used to acquire a diffraction light intensity spectrum in the measurement region of the object 7 (S15). The diffraction light intensity spectrum acquired in S15 is analyzed, and the bottom diameter CDb of the etching mask film 73 is measured (S16).

Subsequently, the T-SAXS measurement device 2 performs measurement while changing the rotation angle of the measurement stage 22 and acquires a plurality of diffraction images (SAXS image group) for the measurement region of the object 7 (S17). The SAXS image group acquired in S17 is analyzed, the three-dimensional shape of the measurement region of the object 7 is estimated, and a shape profile is acquired (S18). In the analysis of the SAXS image group in S18, the analysis section 24 analyzes the three-dimensional shape by setting, as analysis parameters, various shape parameters acquired by the shape parameter measurement unit 3 (the film thickness Tm acquired in S12, the neck diameter CDn acquired in S14, and the bottom diameter CDb acquired in S16).

Figure 13:
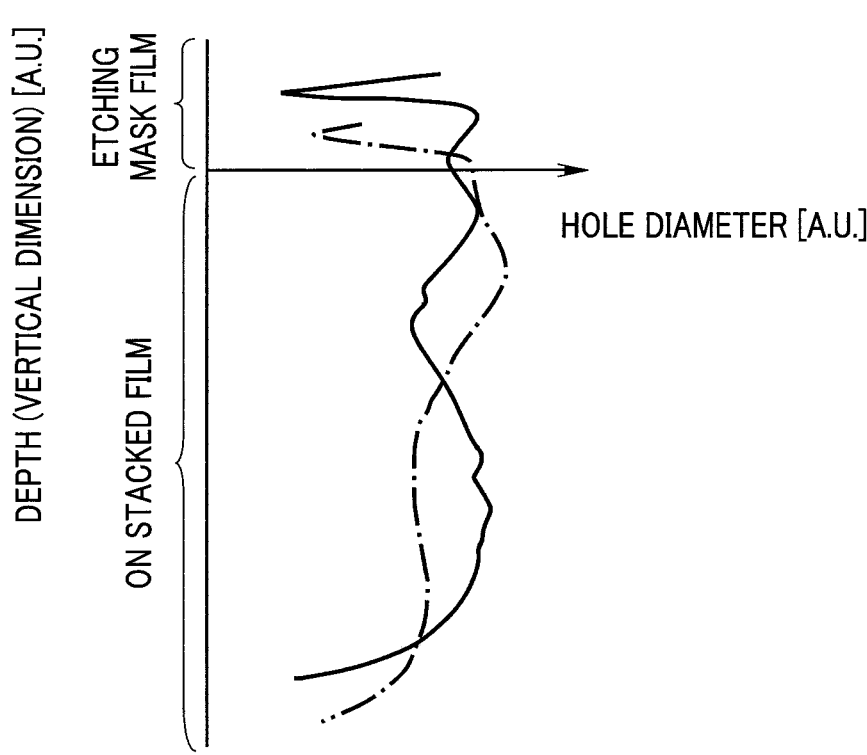
FIG. 13 is a diagram for explaining an example of a shape profile measured by a method according to a comparative example.
Figure 14:
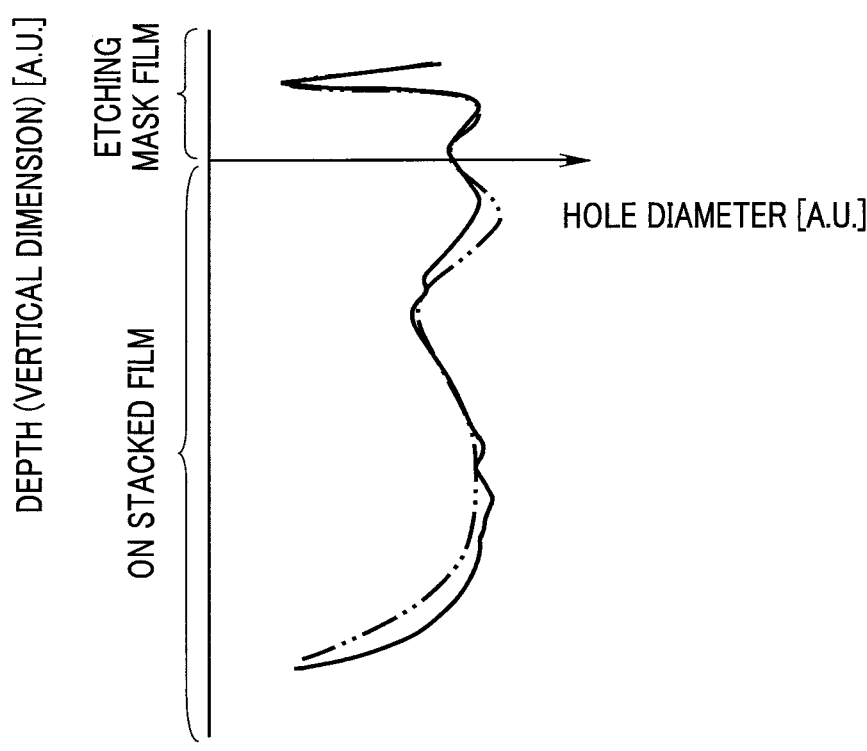
FIG. 14 is a diagram for explaining an example of a shape profile measured by a method according to the embodiment.

FIG. 13 is a diagram for explaining an example of a shape profile measured by a method according to a comparative example. The method according to the comparative example is a method of measuring the three-dimensional shape of the object 7 only with the T-SAXS measurement device 2. In other words, the shape profile is estimated without using various shape parameters acquired by the shape parameter measurement unit 3 at the time of the analysis of the SAXS image group in the T-SAXS measurement device 2. FIG. 14 is a diagram for explaining an example of a shape profile measured by the method according to the embodiment. Note that FIGS. 13 and 14 illustrate the shape profiles with a horizontal axis representing a hole radius and with the vertical axis representing a depth.

In FIG. 13, a one-dotted dashed line indicates a shape profile measured by the method according to the comparative example, and a solid line indicates an actually measured length value (the shape profile obtained through the measurement by sectional SEM). As illustrated in FIG. 13, a depth of the hole 74 (a sum of the film thickness Tm of the etching mask film 73 and the depth of the hole 74 in the ON stacked film 72) in the shape profile measured by the method according to the comparative example is equivalent to the actually measured length value. However, the film thickness Tm of the etching mask film 73 measured by the method according to the comparative example is smaller than the actually measured length value, and a matching level between the shape profile in the comparative example and the actually measured length value is low.

In FIG. 14, a two-dotted dashed line indicates a shape profile measured by the method according to the present embodiment, and a solid line indicates an actually measured length value (a shape profile obtained through measurement by sectional SEM). As illustrated in FIG. 14, the shape profile measured by the method according to the embodiment has a higher matching degree with the actually measured length value than the shape profile measured by the method according to the comparative example. Particularly, the film thickness Tm, the neck diameter CDn, and the bottom diameter CDb in the shape profile according to the embodiment are substantially equal to actually measured values.

In this manner, according to the measurement device of the embodiment, the shape parameters (particularly, the film thickness Tm, the neck diameter CDn, and the bottom diameter CDb of the etching mask film 73) which are difficult to be measured by the T-SAXS measurement device 2 are measured by the shape parameter measurement unit 3. The T-SAXS measurement device 2 analyzes the SAXS image group by using the shape parameters measured by the shape parameter measurement unit 3. It is thus possible to generate a shape profile with higher accuracy. In other words, it is possible to measure the three-dimensional shape of the recessed portion formed in the object 7 in a nondestructive manner with high accuracy.

Note that although the measurement of the film thickness (S11 and S12), the measurement of the neck diameter CDn (S13 and S14), and the measurement of the bottom diameter CDb (S15 and S16) are successively performed in FIG. 12, the order in which the shape parameters are to be measured is not limited thereto. For example, the neck diameter CDn may be measured prior to the measurement of the film thickness Tm. Also, the measurement of these shape parameters may be performed in parallel. In other words, S13 may be started without waiting for an end of S12, and S15 may be started without waiting for an end of S14.

The measurement system 1 according to the embodiment described above is used in an etching process of forming memory holes of a semiconductor storage device including a memory cell array with a three-dimensional structure, for example. Here, the semiconductor storage device including the memory cell array with the three-dimensional structure will be described by using FIG. 15.

Figure 15:
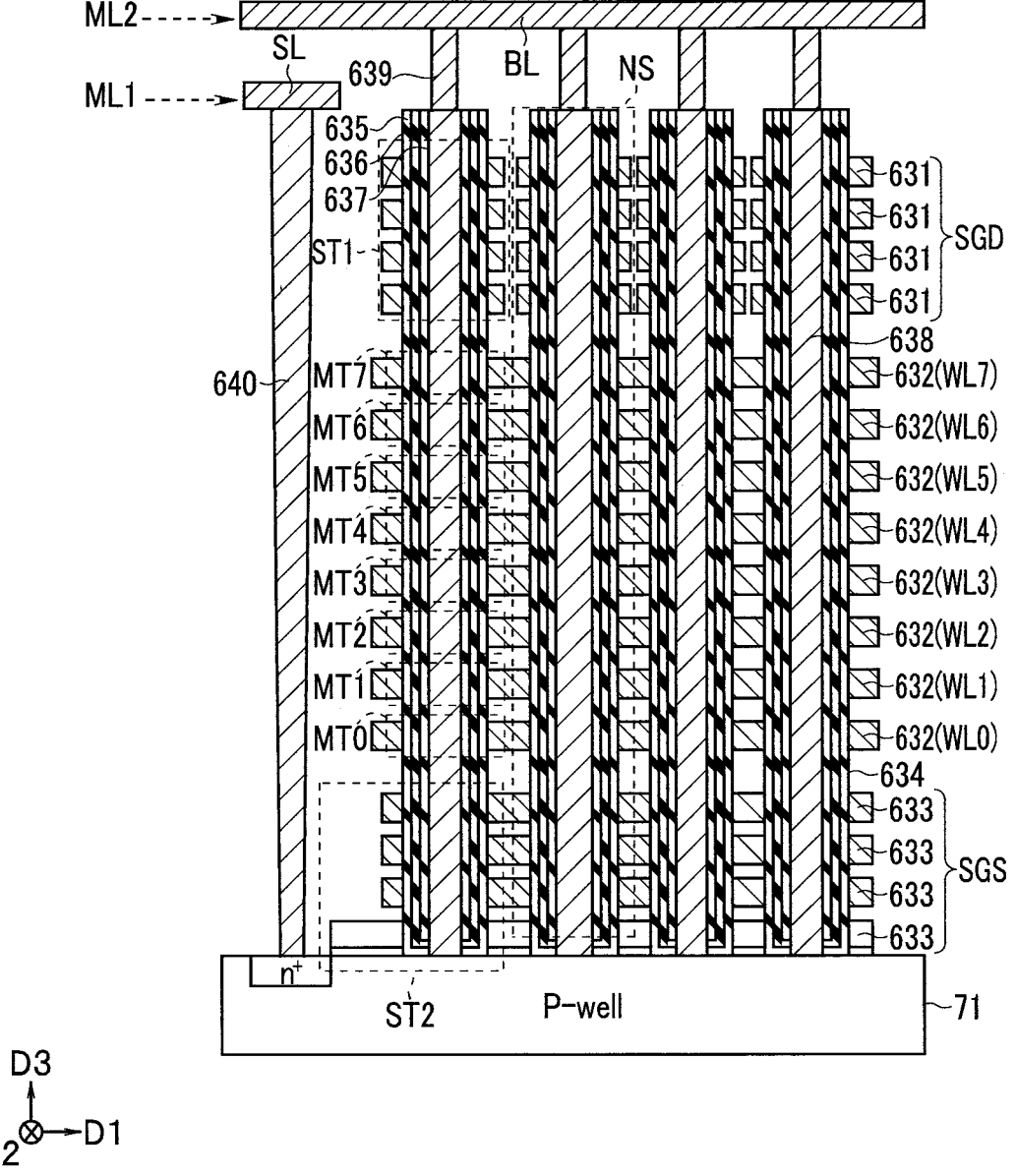
FIG. 15 is a sectional view of a partial region of a semiconductor storage device including a memory cell array of a NAND memory with a three-dimensional structure.

FIG. 15 is a sectional view of a partial region of a semiconductor storage device including a memory cell array of a NAND memory with a three-dimensional structure. For example, a semiconductor wafer for manufacturing the semiconductor storage device functions as the object 7. FIG. 15 illustrates the partial region of the memory cell array. In the following description, a direction of extension of a bit line BL in a plane that is parallel to the surface of the semiconductor substrate 71 will be referred to as a D1 direction. Also, a direction that is parallel to the surface of the semiconductor substrate 71 and perpendicularly intersects the D1 direction will be referred to as a D2 direction. Additionally, a direction that perpendicularly intersects the surface of the semiconductor substrate 71 will be referred to as a D3 direction. In other words, the D3 direction coincides with the z direction.

As illustrated in FIG. 15, a plurality of NAND strings NS are formed on a p type well region (P-well). In other words, a plurality of wiring layers 633 functioning as select gate lines SGS, a plurality of wiring layers 632 functioning as word lines WLi, and a plurality of wiring layers 631 functioning as select gate lines SGD are stacked above the p type well region. Note that although the structure in which eight wiring layers 632 functioning as word lines WLi are stacked is illustrated in FIG. 15, more wiring layers 632, that is, forty eight layers, sixty four layers, ninety six layers, or the like may be stacked in the memory cell array of the semiconductor storage device.

Also, memory holes 634 that penetrate through the wiring layers 633, 632, and 631 and reach the p type well region are formed. Block insulating films 635, charge accumulation films 636, and tunnel insulating films 637 are sequentially formed on side surfaces of the memory holes 634, and further, semiconductor pillars 638 are embedded inside the memory holes 634. The semiconductor pillars 638 are made of polysilicon, for example, and function as regions where channels are formed when memory cell transistors MTi and selection transistors ST1 and ST2 included in the NAND strings NS operate.

In each NAND string NS, the selection transistor ST2, the plurality of memory cell transistors MTi, and the selection transistor ST1 are formed on the p type well region. A wiring layer functioning as a bit line BL is formed on a side further upward than the semiconductor pillars 638. Contact plugs 639 that establish connection between the semiconductor pillars 638 and the bit line BL are formed at upper ends of the semiconductor pillars 638.

Furthermore, an n+ type impurity diffusion layer is formed inside the surface of the p type well region. A contact plug 640 is formed on the n+ type impurity diffusion layer, and a wiring layer functioning as a source line SL is formed on the contact plug 640.

A plurality of configurations as described above are aligned in a depth direction (D2 direction) of the paper sheet of FIG. 15, and a group of the plurality of NAND strings aligned in a line in the depth direction forms one string unit SU.

The wiring layers formed of metal materials, such as the bit line BL and the source line SL, are formed as upper layers than the NAND strings NS after the NAND strings NS are formed. Typically, a plurality of wiring layers formed of metal materials are formed with insulating films interposed therebetween. An example of FIG. 15 illustrates a case where two wiring layers ML1 and ML2 are provided. The bit line BL and the source line SL are formed in one or more layers of these wiring layers ML1 and ML2. For example, FIG. 15 illustrates a case where the source line SL is formed in the wiring layer ML1 which is the first layer from the bottom and the bit line BL is formed in the wiring layer ML2 which is the second layer from the bottom.

Figure 16:
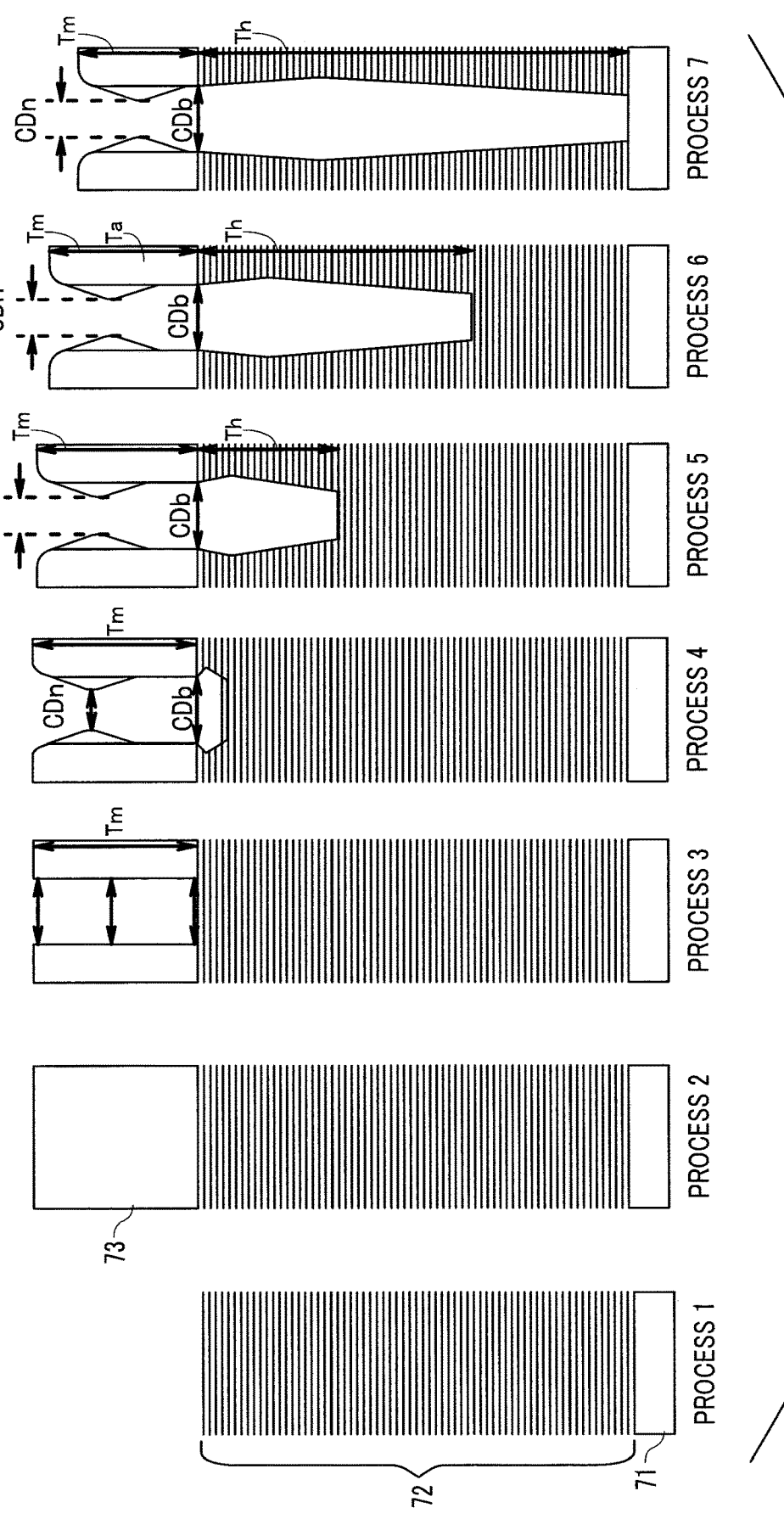
FIG. 16 is a schematic sectional view for explaining a process of forming a memory hole.

Next, a method of forming the memory holes 634 in the semiconductor storage device with the structure as illustrated in FIG. 15 will be described by using FIG. 16. FIG. 16 is a schematic sectional view for explaining processes of forming the memory holes. The memory holes 634 are formed through a plurality of processes, for example. FIG. 16 illustrates a sectional view of the plurality of processes for forming the memory holes 634 in an aligned manner in a temporal order from the left to the right.

First, in the first process (process 1), silicon oxide films and silicon nitride films are alternately deposited on the semiconductor substrate 71, and the ON stacked film 72 is formed on the entire surface of the semiconductor substrate 71. In FIG. 16, solid lines correspond to the silicon nitride films, and blanks adjacent to the solid lines correspond to the silicon oxide films. The silicon nitride films in the ON stacked film 72 are replaced with conductive films (tungsten films, for example) in the following process to serve as wiring layers 631, wiring layers 632, and wiring layers 633. The silicon oxide films in the ON stacked film 72 serve as insulating films between each two adjacent ones of the aforementioned wiring layers 631, 632, and 633.

In the following process (process 2), the etching mask film 73 is deposited on the surface of the ON stacked film 72. An amorphous carbon film, for example, is used as the etching mask film 73. Then, in the next process (process 3), the etching mask film 73 located in a region where the memory hole 634 is to be formed is removed, and an opening portion is formed in the etching mask film 73.

In the following processes (processes 4 to 7), the ON stacked film 72 formed at a lower portion of the opening portion in the etching mask film 73 is removed through dry etching using the etching mask film 73 as a mask. The memory hole 634 is a hole with a high aspect ratio with a diameter of about 100 nm and a depth of several μm, for example. Therefore, appropriate etching conditions may be set in the course of forming the memory hole 634. Thus, the etching conditions are changed in a plurality of stages in the course of forming the memory hole 634. For example, etching is suspended once when each predefined stage ends, and working states (a remaining film thickness of the etching mask film 73, an etching depth of the ON stacked film 72, a sectional shape, and the like) of the hole are measured. Then, the etching conditions are adjusted in accordance with the measured working states, and etching in a next stage is performed. In FIG. 16, a section when shallow etching is performed on the ON stacked film 72 is illustrated as a process 4. Also, a section when etching is performed to such an extent that half the film thickness of the ON stacked film 72 is not reached is illustrated as a process 5. Furthermore, a section when etching is performed to a position that is slightly deeper than the half the film thickness of the ON stacked film 72 is illustrated as a process 6. Note that in the etching for forming the memory hole 634, more "stages" for measuring the working states and adjusting the etching conditions may be defined. The working states are measured every time each stage ends, and feed-back is given to adjust etching conditions for the next stage. Also, the etching conditions for the next stage may not be changed depending on results of measuring the working states.

In FIG. 16, a section at an end timing of a stage later than the process 6 is illustrated as a process 7. In the process 7, the ON stacked film 72 formed at the lower portion of the opening portion of the etching mask film 73 is completely removed, and the formation of the memory hole 634 is completed. Note that an etching depth of the ON stacked film 72 is indicated as Th in FIG. 16.

Figure 17:
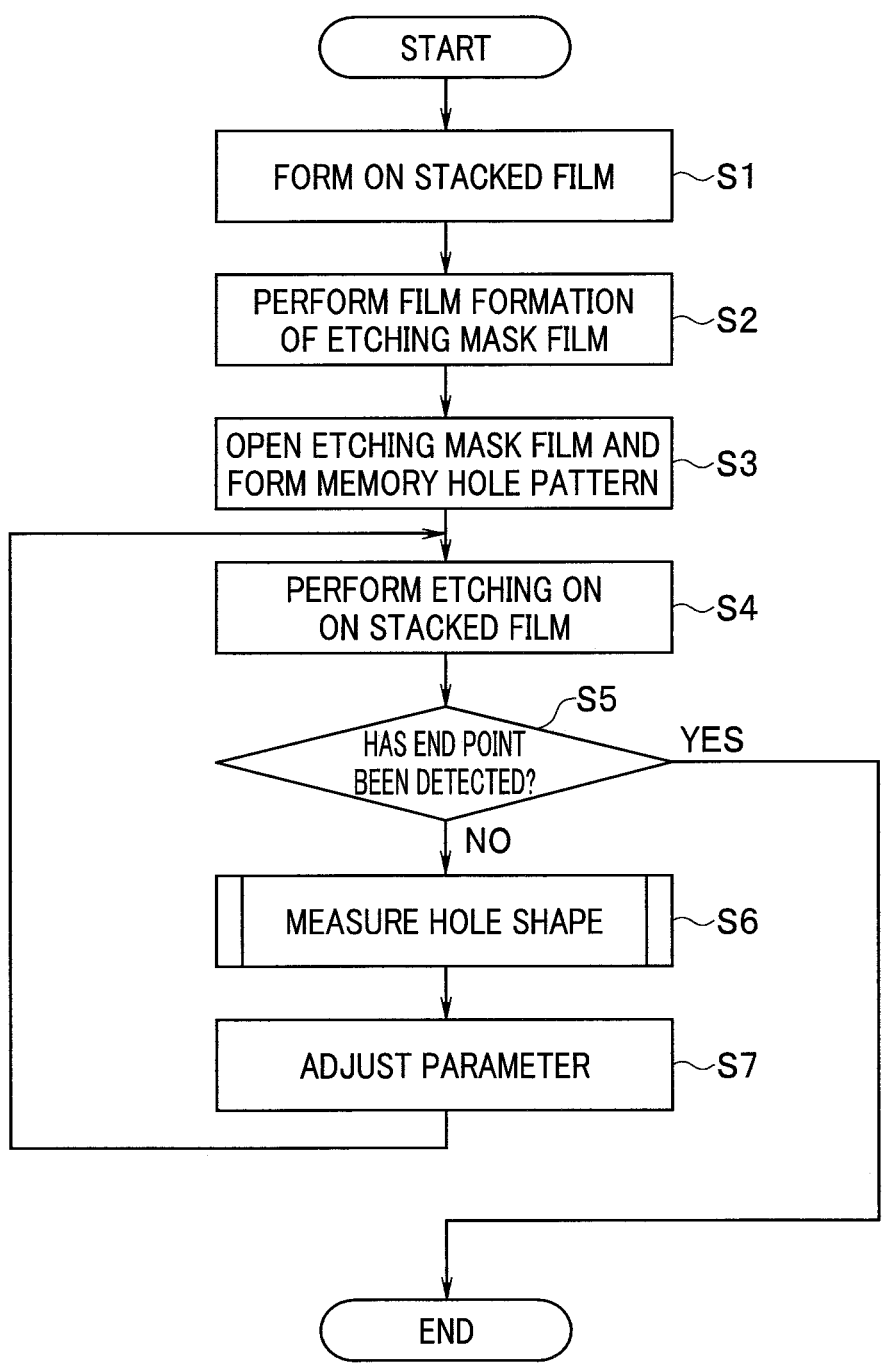
FIG. 17 is a flowchart for explaining an example of a memory hole forming procedure.

The measurement system 1 according to the embodiment can be applied to measurement of working states at the time of forming the memory hole 634. A procedure of forming the memory hole 634 in a case where the measurement system 1 according to the embodiment is applied to measurement of working states will be described by using FIG. 17. FIG. 17 is a flowchart for explaining an example of the procedure of forming the memory hole.

First, silicon oxide films and silicon nitride films are alternately deposited on the semiconductor substrate 71, and the ON stacked film 72 is thereby formed (S1). Subsequently, amorphous carbon as a hard mask material is deposited on the surface of the ON stacked film 72, and the etching mask film 73 is thereby formed (S2). Next, the etching mask film 73 in a region where the memory hole 634 is formed is removed, and an opening portion (memory hole pattern) is formed in the etching mask film 73 (S3).

Subsequently, dry etching (anisotropic etching) of the ON stacked film 72 is performed (S4). Since the film thickness of the ON stacked film 72 is thick, and the diameter of the memory hole 634 is small as described above, the aspect ratio of the hole to be formed as the memory hole 634 at the lower portion of the opening portion of the etching mask film 73 is high. Therefore, the etching is performed in a split manner in a plurality of stages. During the etching, detection regarding whether or not the semiconductor substrate 71 has been exposed to a bottom portion of the opening portion (end point detection) is performed in order to determine an end of the etching (S5). In a case where the semiconductor substrate 71 is detected (S5, YES), the hole formed by the etching is regarded as having penetrated through the ON stacked film 72, and the etching is ended. As described above, the formation of the memory hole 634 is completed.

On the other hand, in a case where the semiconductor substrate 71 is not detected in the end point detection (S5, NO) when the etching in the first stage ends, the etching is temporarily stopped, and worked shapes (the remaining film thickness of the etching mask film 73, the etching depth of the ON stacked film 72, the sectional shape, and the like) of the hole are measured by the measurement system 1 according to the embodiment (S6). S6 is executed by a series of procedure illustrated in the flowchart in FIG. 12 by using the semiconductor wafer in the middle of the formation of the memory hole 634 as the object 7. A three-dimensional shape of the memory hole 634 formed in the object 7 at the time of measurement is outputted as a shape profile by executing the procedure illustrated in FIG. 12.

In a case where a hole with a high aspect ratio like the memory hole 634 is formed, etching is performed for a long time period. During the etching, the etching mask film 73 is also scraped little by little while an etching rate is lower than the etching rate of the ON stacked film 72 that is an etching target film. If the etching mask film 73 is completely scraped, the ON stacked film 72 is exposed to an upper surface of the object 7. If the etching is continued in the state where the ON stacked film 72 is exposed to the upper surface of the object 7, not only the bottom portion of the opening portion but also the surface of the ON stacked film 72 are etched, it is thus not possible to form wiring layers to be formed in the following process, and a defective product is obtained.

Also, residues and the like of the scraped etching mask film 73 adhere to a side wall of the opening portion in the etching mask film 73 during the etching. So-called necking in which adhering substances reduce the hole diameter or block the hole may occur at the opening portion. If necking occurs, the etching rate may be degraded, or the hole may be obliquely worked instead of being perpendicularly worked. The degradation of the etching rate may lead to degradation of productivity. Also, if the memory hole 634 is obliquely formed, a distance between adjacent memory holes 634 may be shortened, or the adjacent memory holes 634 may be connected in some cases, and an operation failure may be caused. When a hole with a high aspect ratio like the memory hole 634 is formed in this manner, it is effective to manage the etching conditions in accordance with the remaining film thickness Tm of the etching mask film 73 and the neck diameter CDn along with the three-dimensional shape of the worked hole. Therefore, it is desired to measure the film thickness Tm and the neck diameter CDn with high accuracy in the measurement of the worked shape in S6.

In subsequent S7, parameters for etching in the next stage are adjusted as appropriate on the basis of the shape profile measured in S6. Then, the processing returns to S4, and the etching of the ON stacked film 72 in the next stage is performed. The series of procedure from S4 to S7 is repeatedly executed until the end point is detected in S5.

As described above, according to the measurement device of the embodiment, the shape parameters which are difficult to be measured by the T-SAXS measurement device are measured by the shape parameter measurement unit in advance when the three-dimensional shape of the hole formed in the object by etching is measured by using the T-SAXS measurement device. The shape parameter measurement unit includes a measurement device capable of measuring the shape parameters with high accuracy. The T-SAXS measurement device analyzes a SAXS image group by using the shape parameters measured by the shape parameter measurement unit. In this manner, it is possible to measure the three-dimensional shape of the hole with high accuracy. Particularly, it is possible to further improve measurement accuracy of the three-dimensional shape of the hole by measuring each shape parameter, namely the remaining film thickness of the etching mask film, the neck diameter of the hole in the etching mask film, and the diameter (bottom diameter) of the hole at the interface between the etching mask film and the working target film (ON stacked film) by the shape parameter measurement unit with high accuracy and inputting the parameters to the T-SAXS measurement device.

Also, it is possible to forward the working of the hole while properly changing the etching conditions through an application to an inspection (measurement of the worked shape) of the etching process (the etching process of forming a hole with a high aspect ratio like a memory hole, in particular) in the manufacturing of the semiconductor storage device as described above, and it is thus possible to prevent a working failure of the hole in advance.

Note that the shape parameters measured by the shape parameter measurement unit 3 and inputted to the T-SAXS measurement device 2 are not limited to the aforementioned three parameters. For example, a center profile of the hole may be measured by the shape parameter measurement unit 3 and may be inputted to the T-SAXS measurement device 2 in addition to the aforementioned three parameters. The center profile is a shape profile obtained by plotting a center position of the hole when the hole is cut in a plane parallel to the xy plane in the z direction.

Figure 18:
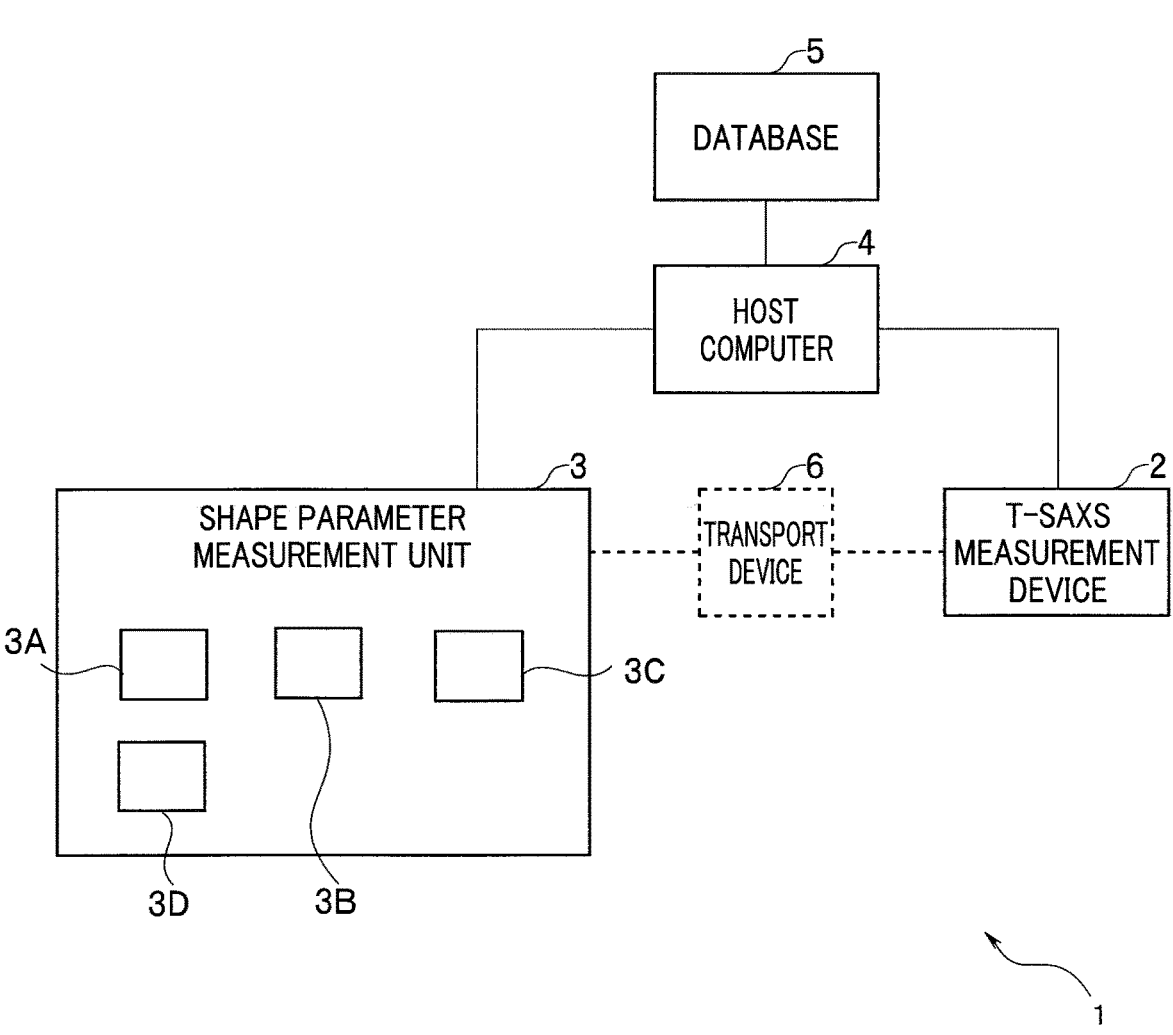
FIG. 18 is a block diagram illustrating another configuration example of the measurement system including the measurement device according to the first embodiment.
Figure 19:
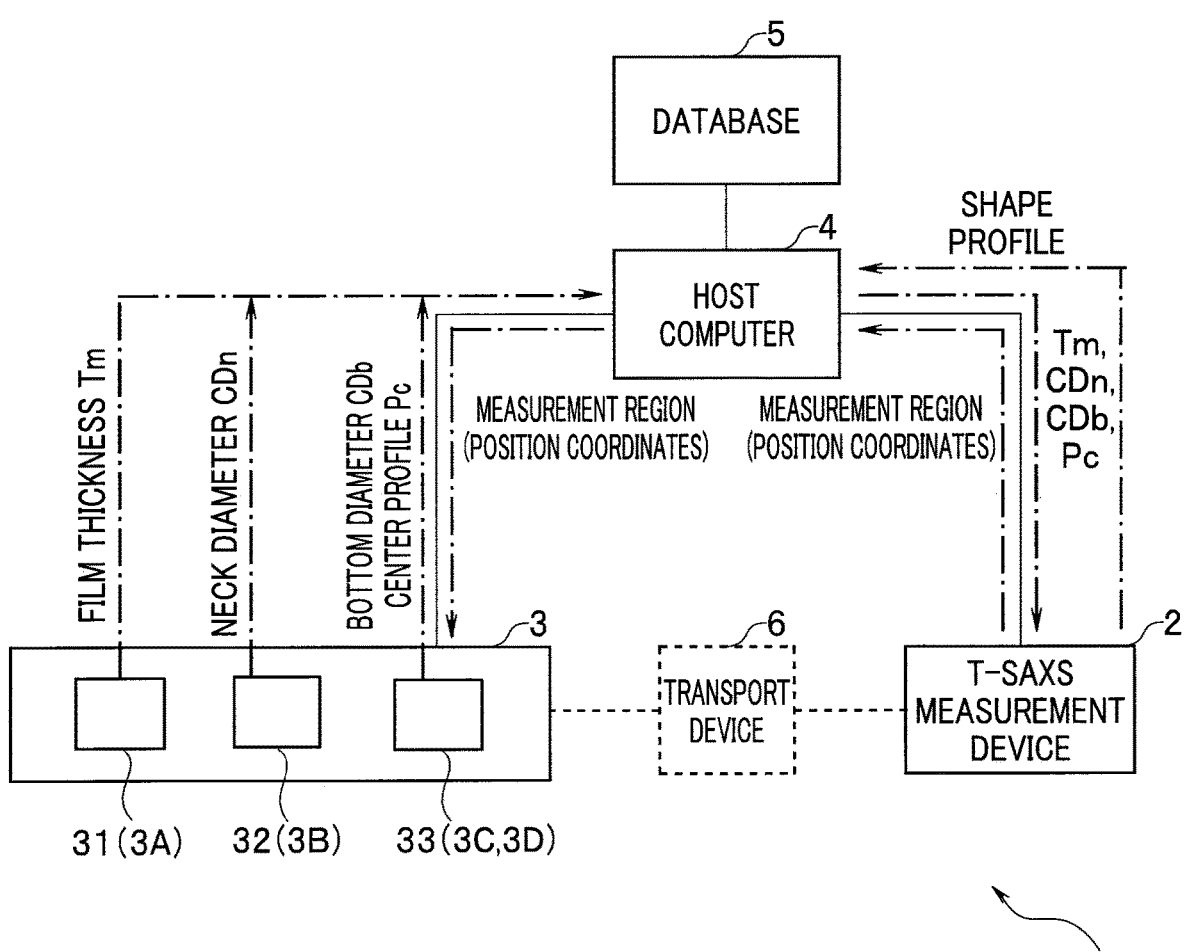
FIG. 19 is a diagram for explaining an example of a flow of data in the measurement system illustrated in FIG. 18.

FIG. 18 is a block diagram illustrating another configuration example of the measurement system including the measurement device according to the first embodiment. Also, FIG. 19 is a diagram for explaining an example of a flow of data in the measurement system illustrated in FIG. 18. FIG. 18 illustrates the measurement system 1 that measures four shape parameters, namely the film thickness Tm, the neck diameter CDn, the bottom diameter CDb, and a center profile Pc by the shape parameter measurement unit 3 and outputs the shape parameters to the T-SAXS measurement device 2. As illustrated in FIG. 18, the shape parameter measurement unit 3 includes a center profile measurement section 3D that measures the center profile Pc, in addition to the film thickness measurement section 3A, the neck diameter measurement section 3B, and the bottom diameter measurement section 3C. The other configurations are similar to the configurations in the measurement system 1 illustrated in FIG. 1. The second multi-wavelength optical measurement device 33 used as the bottom diameter measurement section 3C can measure not only the bottom diameter CDb but also the center profile Pc with high accuracy. In such a case, the second multi-wavelength optical measurement device 33 can serve both as the bottom diameter measurement section 3C and as the center profile measurement section 3D. In other words, the bottom diameter CDb and the center profile Pc are outputted from the second multi-wavelength optical measurement device 33 to the host computer 4 as illustrated in FIG. 19. The host computer 4 outputs the film thickness Tm, the neck diameter CDn, the bottom diameter CDb, and the center profile Pc to the T-SAXS measurement device 2. The T-SAXS measurement device 2 analyzes a SAXS image group by using the four shape parameters. Accuracy of the three-dimensional shape of the hole measured by the T-SAXS measurement device 2 is further improved by adding the center profile Pc measured with high accuracy to the shape parameters.

Also, a tilt (an inclination level to the z direction) of the hole may be measured by the shape parameter measurement unit 3 instead of or in addition to the center profile Pc, and may be inputted to the T-SAXS measurement device 2. The tilt is a shape parameter obtained by plotting a distance between a line that passes through the center of the hole in the frontmost surface of the object 7 and is parallel to the z direction and the center profile in the z direction.

Figure 20:
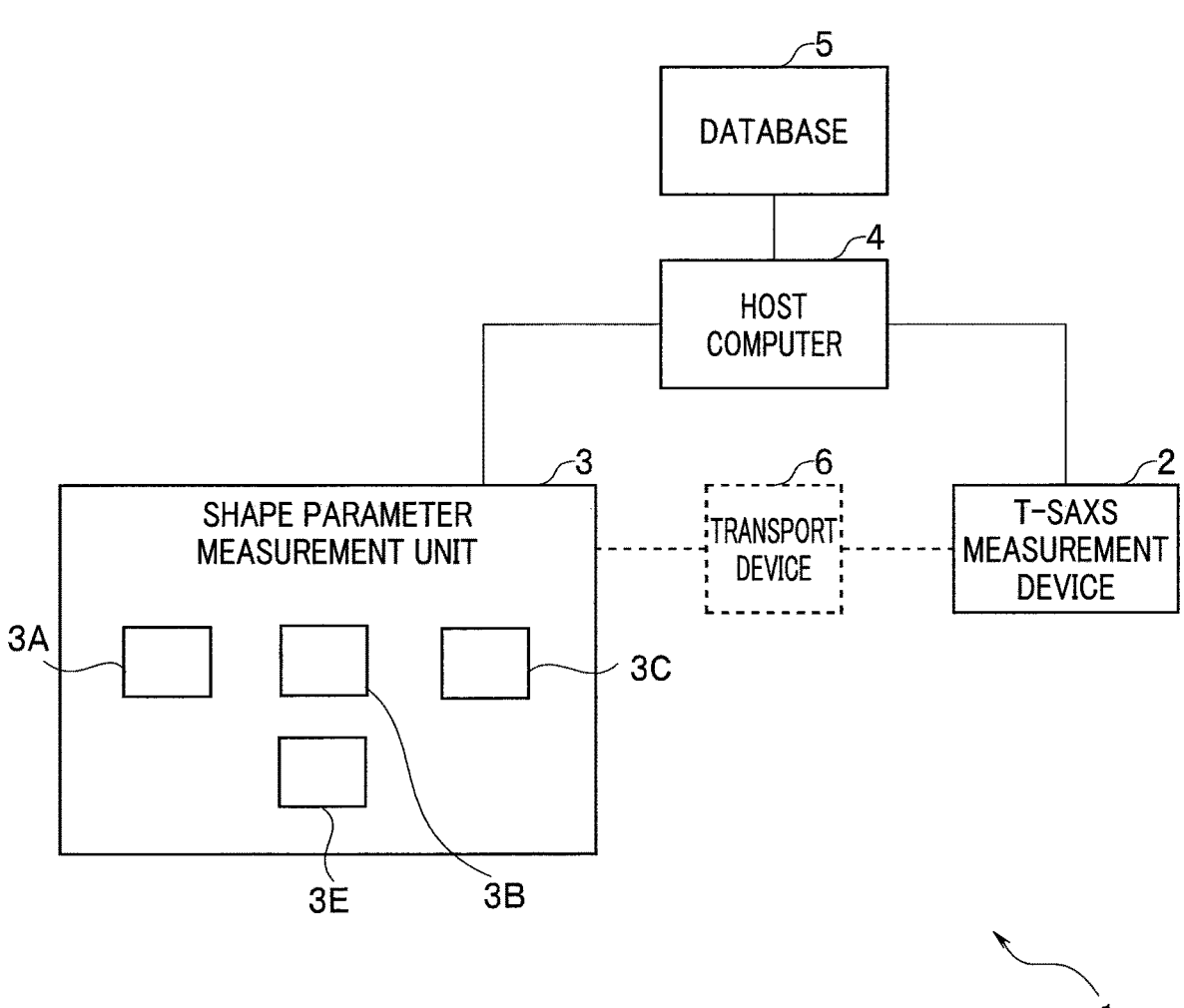
FIG. 20 is a block diagram illustrating another configuration example of the measurement system including the measurement device according to the first embodiment.
Figure 21:
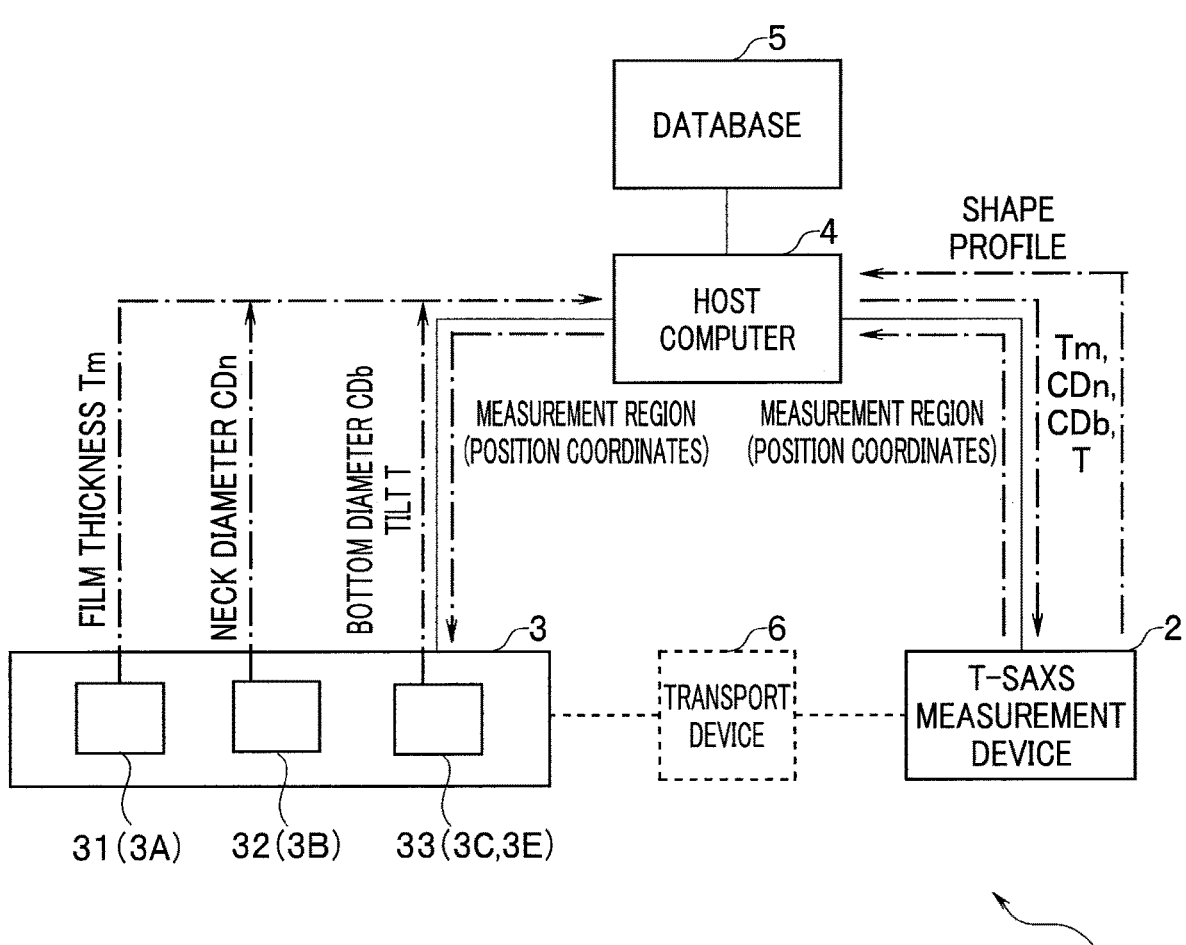
FIG. 21 is a diagram for explaining an example of a flow of data in the measurement system illustrated in FIG. 20.

FIG. 20 is a block diagram illustrating another configuration example of the measurement system including the measurement device according to the first embodiment. Also, FIG. 21 is a diagram for explaining an example of a flow of data in the measurement system illustrated in FIG. 20. FIG. 20 illustrates the measurement system 1 that measures four shape parameters, namely the film thickness Tm, the neck diameter CDn, the bottom diameter CDb, and a tilt T by the shape parameter measurement unit 3 and outputs the shape parameters to the T-SAXS measurement device 2. As illustrated in FIG. 20, the shape parameter measurement unit 3 includes a tilt measurement section 3E that measures the tilt T in addition to the film thickness measurement section 3A, the neck diameter measurement section 3B, and the bottom diameter measurement section 3C. The other configurations are similar to the configurations in the measurement system 1 illustrated in FIG. 1. The second multi-wavelength optical measurement device 33 used as the bottom diameter measurement section 3C can measure not only the bottom diameter CDb but also the tilt T with high accuracy. In such a case, the second multi-wavelength optical measurement device 33 can serve both as the bottom diameter measurement section 3C and the tilt measurement section 3E. In other words, the bottom diameter CDb and the tilt T are outputted from the second multi-wavelength optical measurement device 33 to the host computer 4 as illustrated in FIG. 21. The host computer 4 outputs the film thickness Tm, the neck diameter CDn, the bottom diameter CDb, and the tilt T to the T-SAXS measurement device 2. The T-SAXS measurement device 2 analyzes a SAXS image group by using the four shape parameters. Accuracy of the three-dimensional shape of the hole measured by the T-SAXS measurement device 2 is further improved by adding the tilt T measured with high accuracy to the shape parameters.

Also, a bow diameter CDbw of the hole may be measured by the shape parameter measurement unit 3 and may be inputted to the T-SAXS measurement device 2 instead of or in addition to the center profile Pc or the tilt T.

Figure 30:
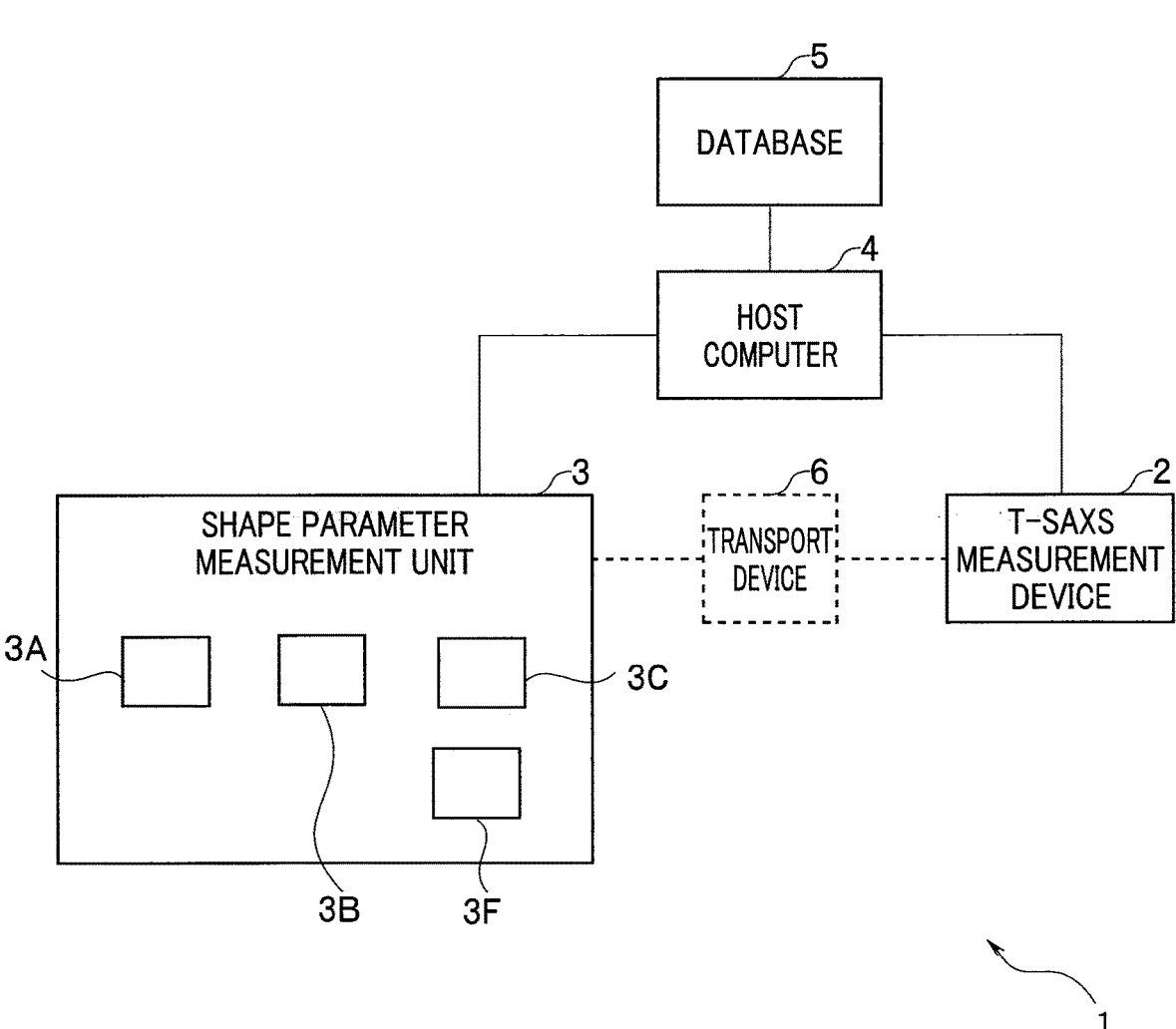
FIG. 30 is a block diagram illustrating another configuration example of the measurement system including the measurement device according to the first embodiment.
Figure 31:
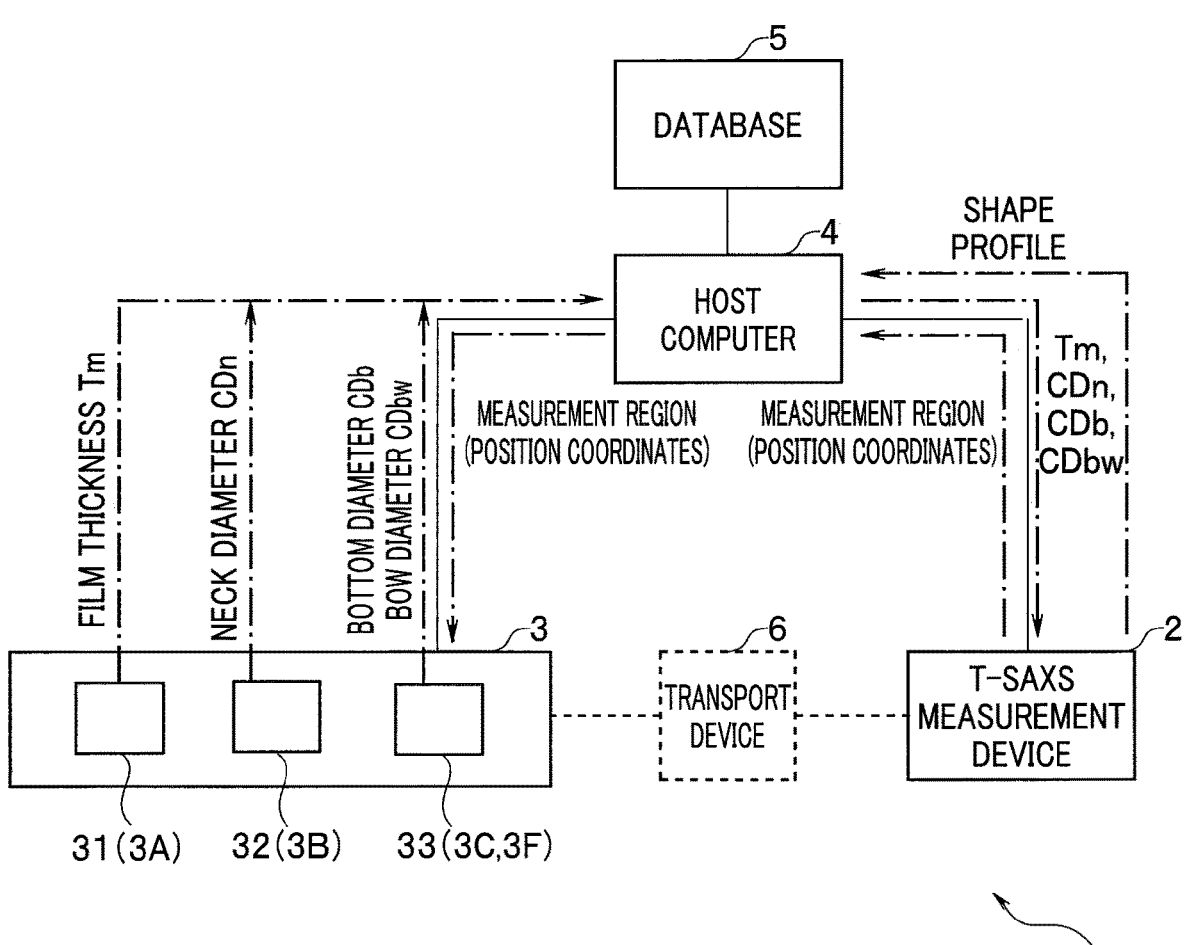
FIG. 31 is a diagram for explaining an example of a flow of data in the measurement system illustrated in FIG. 30.

FIG. 30 is a block diagram illustrating another configuration example of the measurement system including the measurement device according to the first embodiment. Also, FIG. 31 is a diagram for explaining an example of a flow of data in the measurement system illustrated in FIG. 30. FIG. 30 illustrates the measurement system 1 that measures four shape parameters, namely the film thickness Tm, the neck diameter CDn, the bottom diameter CDb, and the bow diameter CDbw by the shape parameter measurement unit 3 and outputs the shape parameters to the T-SAXS measurement device 2. As illustrated in FIG. 30, the shape parameter measurement unit 3 includes a bow diameter measurement section 3F that measures the bow diameter CDbw in addition to the film thickness measurement section 3A, the neck diameter measurement section 3B, and the bottom diameter measurement section 3C. The other configurations are similar to the configurations in the measurement system 1 illustrated in FIG. 1. The second multi-wavelength optical measurement device 33 used as the bottom diameter measurement section 3C can measure not only the bottom diameter CDb but also the bow diameter CDbw with high accuracy. In such a case, the second multi-wavelength optical measurement device 33 can serve both as the bottom diameter measurement section 3C and the bow diameter measurement section 3F. In other words, the bottom diameter CDb and the bow diameter CDbw are outputted from the second multi-wavelength optical measurement device 33 to the host computer 4 as illustrated in FIG. 31. The host computer 4 outputs the film thickness Tm, the neck diameter CDn, the bottom diameter CDb, and the bow diameter CDbw to the T-SAXS measurement device 2. The T-SAXS measurement device 2 analyzes a SAXS image group by using the four shape parameters. Accuracy of the three-dimensional shape of the hole measured by the T-SAXS measurement device 2 is further improved by adding the bow diameter CDbw measured with high accuracy to the shape parameters.

Second Embodiment

Next, a second embodiment will be described. A measurement device according to the present embodiment is different from the aforementioned first embodiment in a method of acquiring shape parameters used in a T-SAXS measurement device 2. Since a structure of an object 7 as a measurement target is similar to the structure in the aforementioned first embodiment, description will be omitted. Hereinafter, only differences from the first embodiment will be described.

Figure 22:
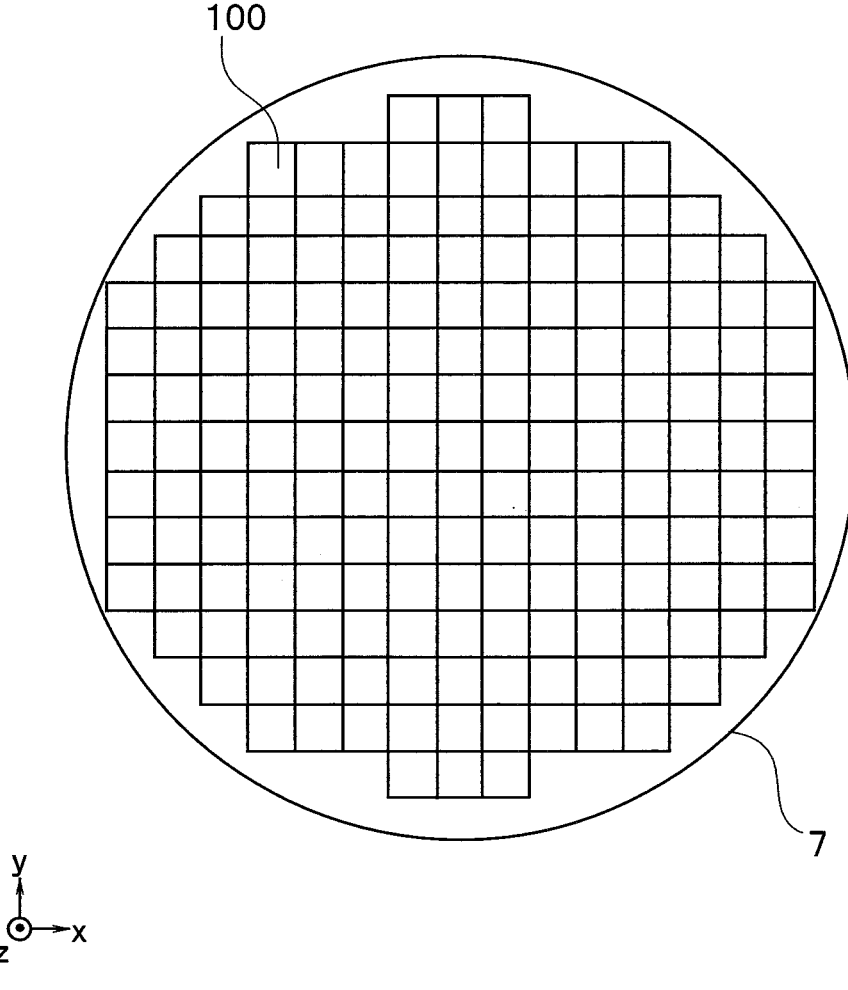
FIG. 22 is a plan view for explaining an example of a layout of memory chips disposed on a semiconductor wafer.

FIG. 22 is a plan view for explaining an example of a layout of memory chips disposed on a semiconductor wafer. As illustrated in FIG. 22, a plurality of memory chips 100 are aligned in a matrix shape in the x direction and the y direction on the semiconductor wafer as an object 7. A memory cell array including a hole (memory hole) as a target of measurement of a three-dimensional shape is formed in each memory chip 100.

In a case where various films are caused to be deposited on the semiconductor wafer by a CVD technique or the like, it is difficult to form the films with uniform film thicknesses over the entire surface of the semiconductor wafer. It is also difficult to work the films with uniform shapes over the entire surface of the semiconductor wafer in a case where the deposited films are worked by a lithography technique and an etching technique. In other words, shape parameters (for example, a film thickness Tm of an etching mask film 73, a neck diameter CDn, and a bottom diameter CDb) may be different values depending on a position of the hole 74 as a target of measurement.

Thus, the measurement device according to the present embodiment measures the shape parameters in advance at a plurality of locations in the plane of the semiconductor wafer and analyzes an in-plane trend of the shape parameters. Analysis results are held as a shape parameter map. Data of the shape parameters at a position of a three-dimensional shape measurement region is extracted from the shape parameter map and is used to analyze an SAXS image.

With such a configuration, it is not necessary to measure the shape parameters again even if the position of the three-dimensional shape measurement region is changed in the course of the measurement, and it is thus possible to analyze the SAXS image with high accuracy in a short time period.

Figure 23:
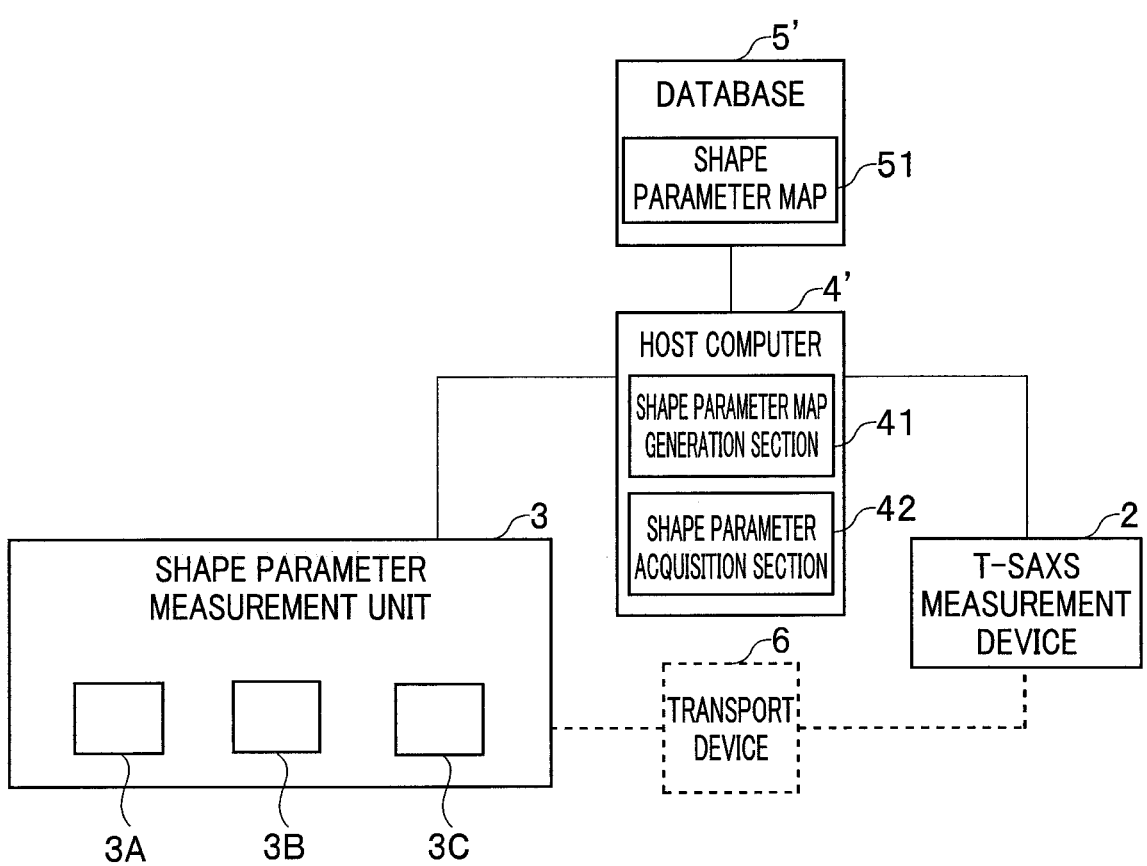
FIG. 23 is a block diagram illustrating a configuration example of a measurement system including a measurement device according to a second embodiment.

FIG. 23 is a block diagram illustrating a configuration example of a measurement system including a measurement device according to the second embodiment. The measurement system 1 according to the present embodiment includes a T-SAXS measurement device 2, a shape parameter measurement unit 3, a host computer 4', and a database 5'. The host computer 4' as an information processing device is equipped with a shape parameter map generation section 41 and a shape parameter acquisition section 42. The database 5' stores shape parameter maps 51.

Figure 24:
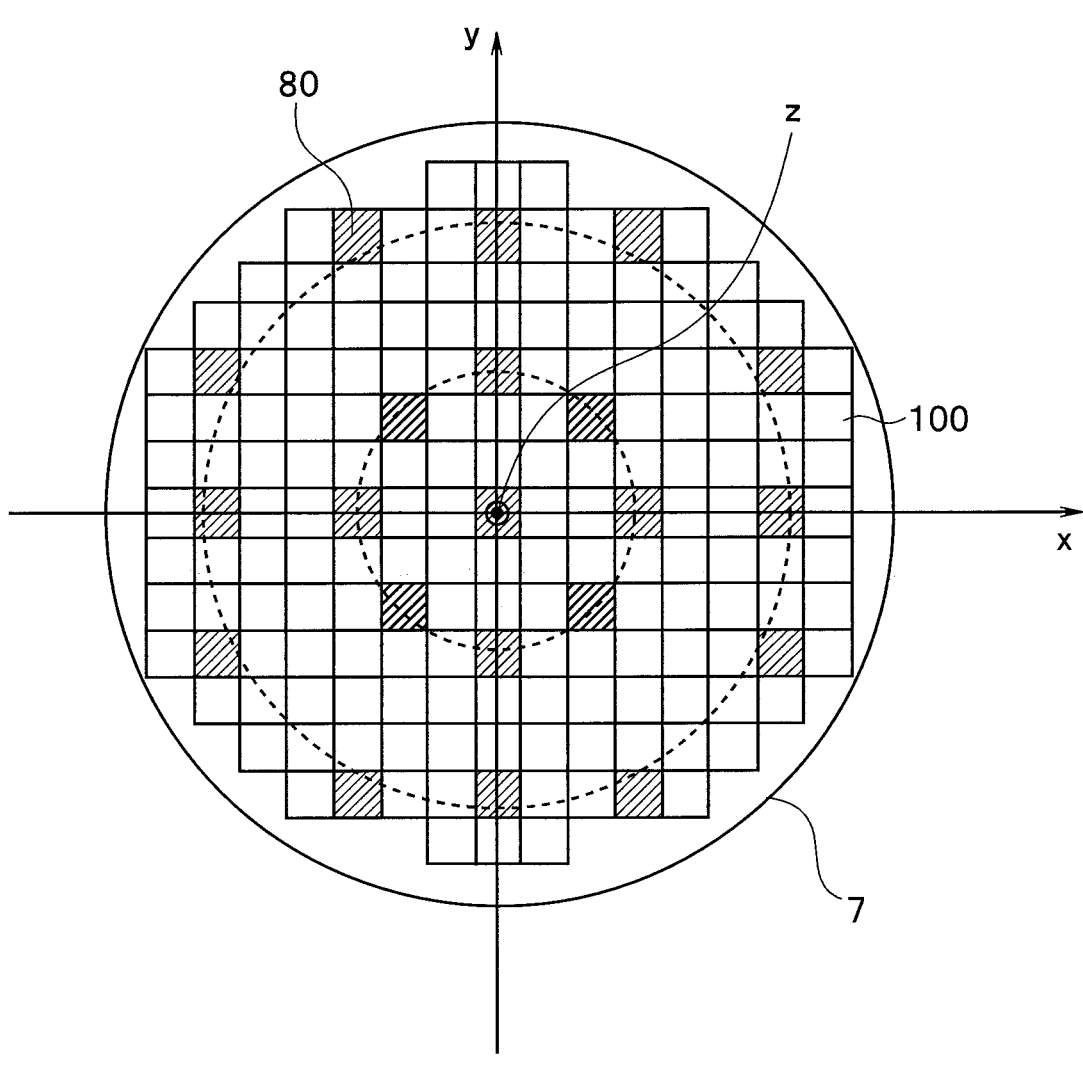
FIG. 24 is a plan view for explaining an example of shape parameter measurement target regions.

The shape parameter map generation section 41 provides an instruction for positions (position coordinates on the semiconductor wafer, for example) where data is to be acquired to the shape parameter measurement unit 3. As the positions where data is to be acquired, a plurality of different positions are indicated by the instruction. FIG. 24 is a plan view for explaining an example of shape parameter measurement target regions. FIG. 24 illustrates shape parameter measurement target regions 80 on a semiconductor wafer as the object 7. A plurality of measurement target regions 80 are set on the semiconductor wafer. As illustrated in FIG. 24, chips 100 at positions that substantially equally divide the circumference of each of one or more circles with different radii around a center of the semiconductor wafer as an origin are set as the measurement target regions 80, for example. In the example illustrated in FIG. 24, the measurement target regions 80 are set at a total of twenty one locations, namely one location at the center, eight locations on the circumference of an inner circle of two concentric circles, and twelve locations on the circumference of an outer circle. Note that the measurement target regions 80 may be set at different positions or a different number of measurement target regions 80 may be set depending on the shape parameters.

Also, the shape parameter map generation section 41 analyzes an in-plane trend for each shape parameter on the basis of data of the shape parameters measured by the shape parameter measurement unit 3 for the set measurement target regions 80. Specifically, data of positions where the shape parameters have not been measured is estimated and interpolated by using data of the measurement target regions 80. Furthermore, the shape parameter map generation section 41 outputs analysis results as the shape parameter maps 51 indicating in-plane distribution of the shape parameters to the database 5'.

Figure 25:
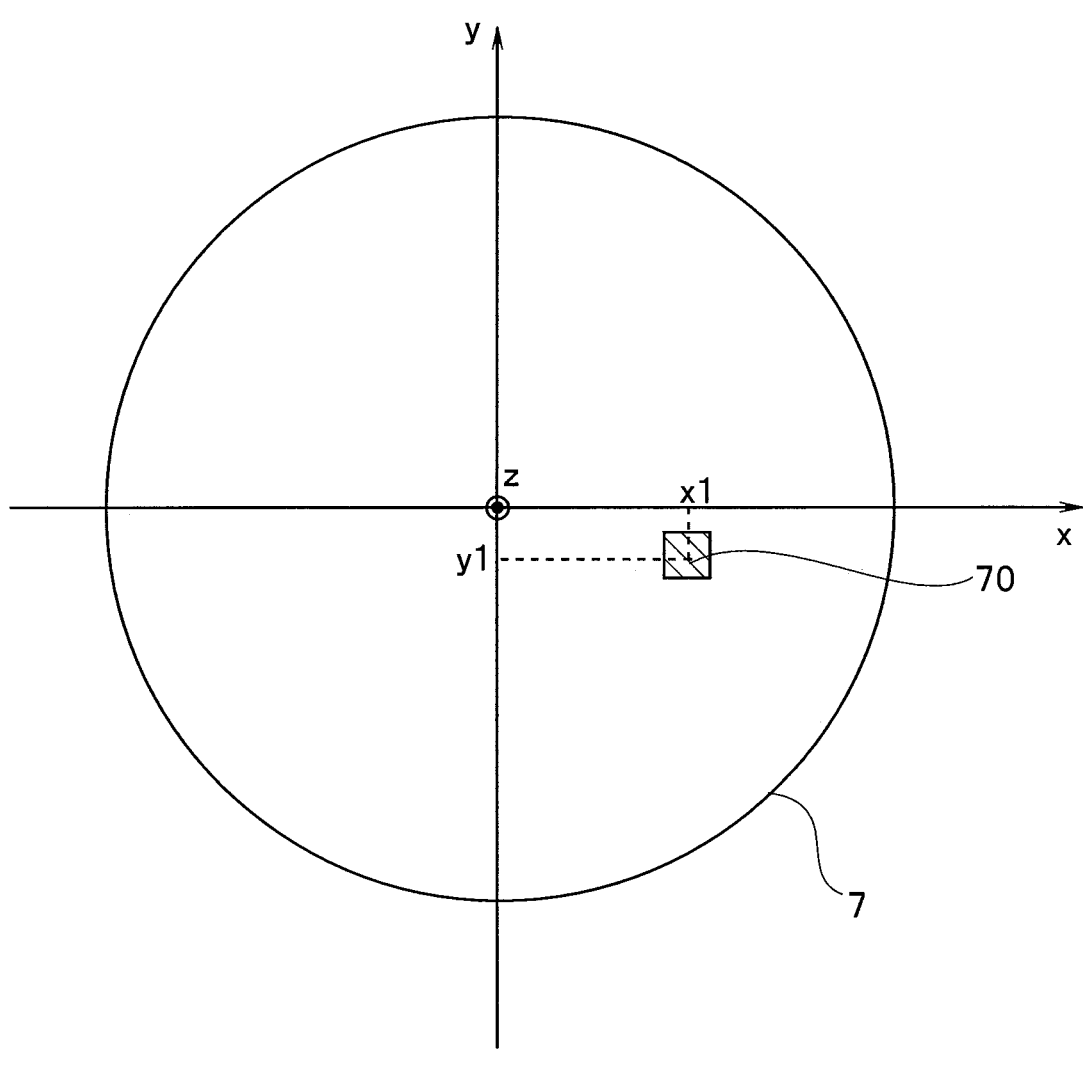
FIG. 25 is a plan view for explaining an example of a position of a three-dimensional shape measurement region.

The shape parameter acquisition section 42 extracts, from the shape parameter maps 51, data of each shape parameter corresponding to the positions of the three-dimensional shape measurement regions. FIG. 25 is a plan view for explaining an example of a position of a three-dimensional shape measurement region. Furthermore, the shape parameter acquisition section 42 outputs the extracted data to the T-SAXS measurement device 2. FIG. 25 illustrates a three-dimensional shape measurement region 70 on a semiconductor wafer as the object 7. Once the measurement region 70 with an x coordinate of x1 and a y coordinate of y1 is set as illustrated in FIG. 25, for example, the shape parameter acquisition section 42 extracts data of (x, y)=(x1, y1) from the shape parameter maps 51 stored in the database 5' and outputs the data to the T-SAXS measurement device 2.

Figure 26:
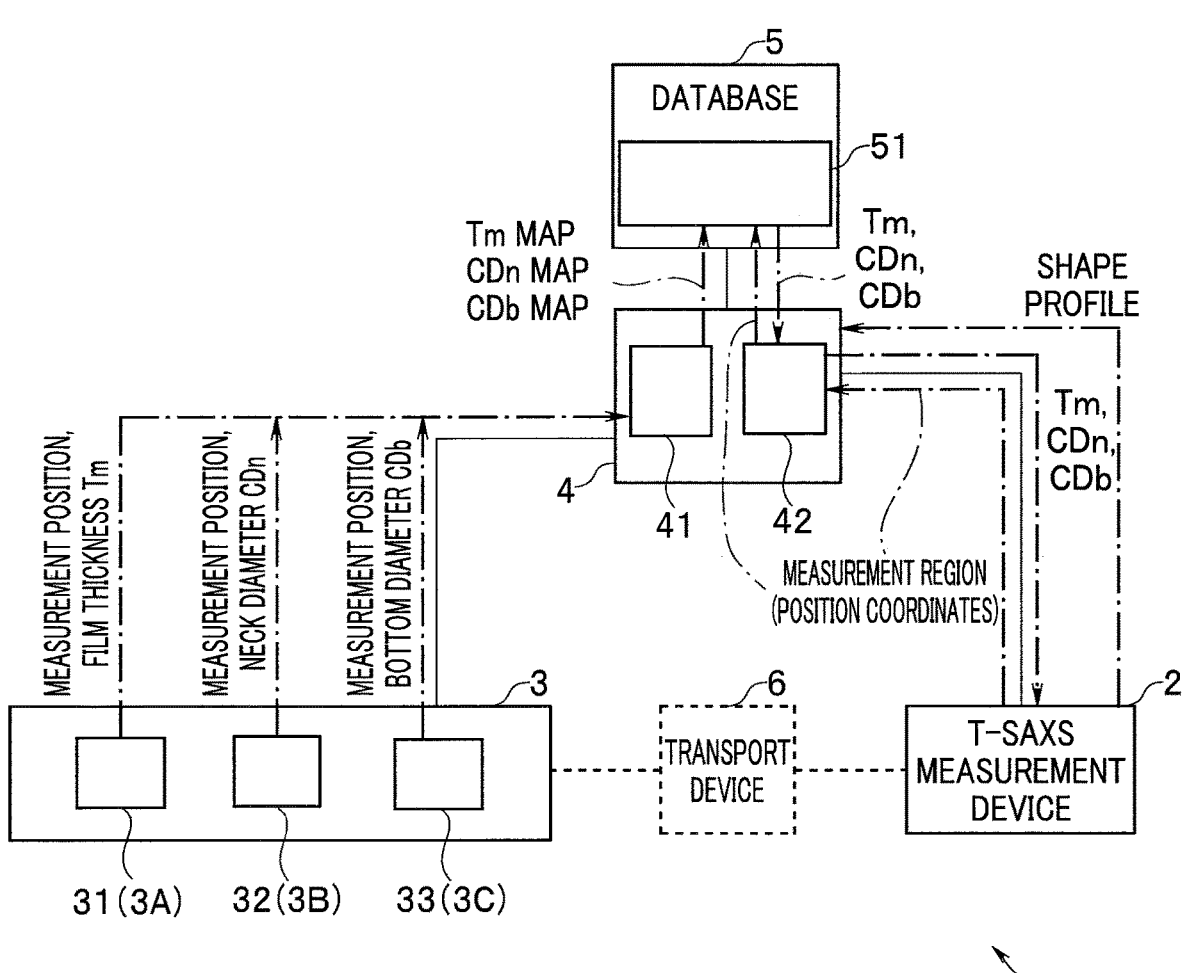
FIG. 26 is a diagram for explaining an example of a flow of data in the measurement system according to the second embodiment.

Next, a three-dimensional shape measurement method of the measurement system according to the second embodiment will be described by using FIGS. 26 to 29. FIG. 26 is a diagram for explaining an example of a flow of data in the measurement system according to the second embodiment. FIG. 26 illustrates an example of a case where the shape parameter measurement unit 3 measures a film thickness Tm, a neck diameter CDn, and a bottom diameter CDb and the shape parameters are used in SAXS image group analysis in the T-SAXS measurement device 2.

For each of the shape parameters, namely the film thickness Tm, the neck diameter CDn, and the bottom diameter CDb, position coordinates of a plurality of measurement target regions 80 are inputted from the host computer 4' to the shape parameter measurement unit 3 (not illustrated). For the input position coordinates, the shape parameters measured by the shape parameter measurement unit 3 are outputted to the shape parameter map generation section 41. The film thickness Tm is outputted from a first multi-wavelength optical measurement device 31 of the shape parameter measurement unit 3 to the shape parameter map generation section 41. The neck diameter CDn is outputted from an electron beam measurement device 32 of the shape parameter measurement unit 3 to the shape parameter map generation section 41. The bottom diameter CDb is outputted from a second multi-wavelength optical measurement device 33 of the shape parameter measurement unit 3 to the shape parameter map generation section 41. Note that data of the shape parameters are outputted as a pair with the position coordinates of the measurement target regions 80.

The shape parameter maps 51 generated on the basis of the data measured by the shape parameter measurement unit 3 are outputted from the shape parameter map generation section 41 to the database 5' and are stored in the database 5'. The shape parameter map 51 is generated for each shape parameter. In the case of the example illustrated in FIG. 26, the three shape parameter maps 51, namely a film thickness Tm map, a neck diameter CDn map, and a bottom diameter CDb map are generated and stored, for example.

On the other hand, the position coordinates of the measurement regions of the object 7 are set by the T-SAXS measurement device 2 and are inputted to the shape parameter acquisition section 42 of the host computer 4'. The shape parameter acquisition section 42 extracts data corresponding to the position coordinates of the measurement regions from the shape parameter maps 51 stored in the database 5'. The extracted data (the film thickness Tm, the neck diameter CDn, and the bottom diameter CDb) is outputted from the shape parameter acquisition section 42 to the T-SAXS measurement device 2.

Shape profiles of the measurement regions of the object 7 are outputted from the T-SAXS measurement device 2 to the host computer 4'. The shape profiles are displayed on a display device, which is not illustrated, of the host computer 4' or is outputted to and stored in the database 5'.

Figure 27:
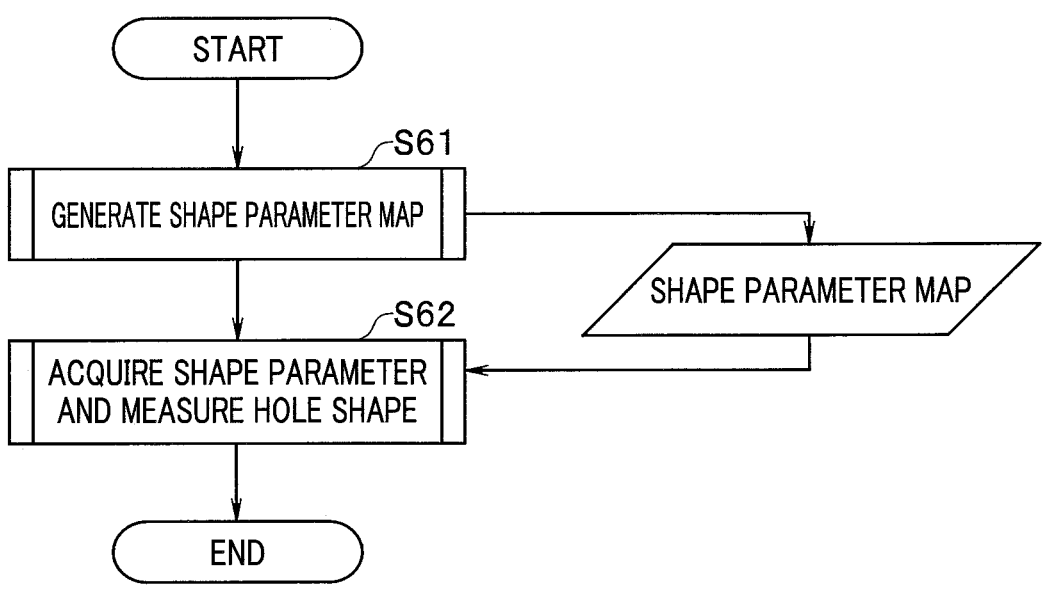
FIG. 27 is a flowchart for explaining an example of a measurement method according to the second embodiment.
Figure 28:
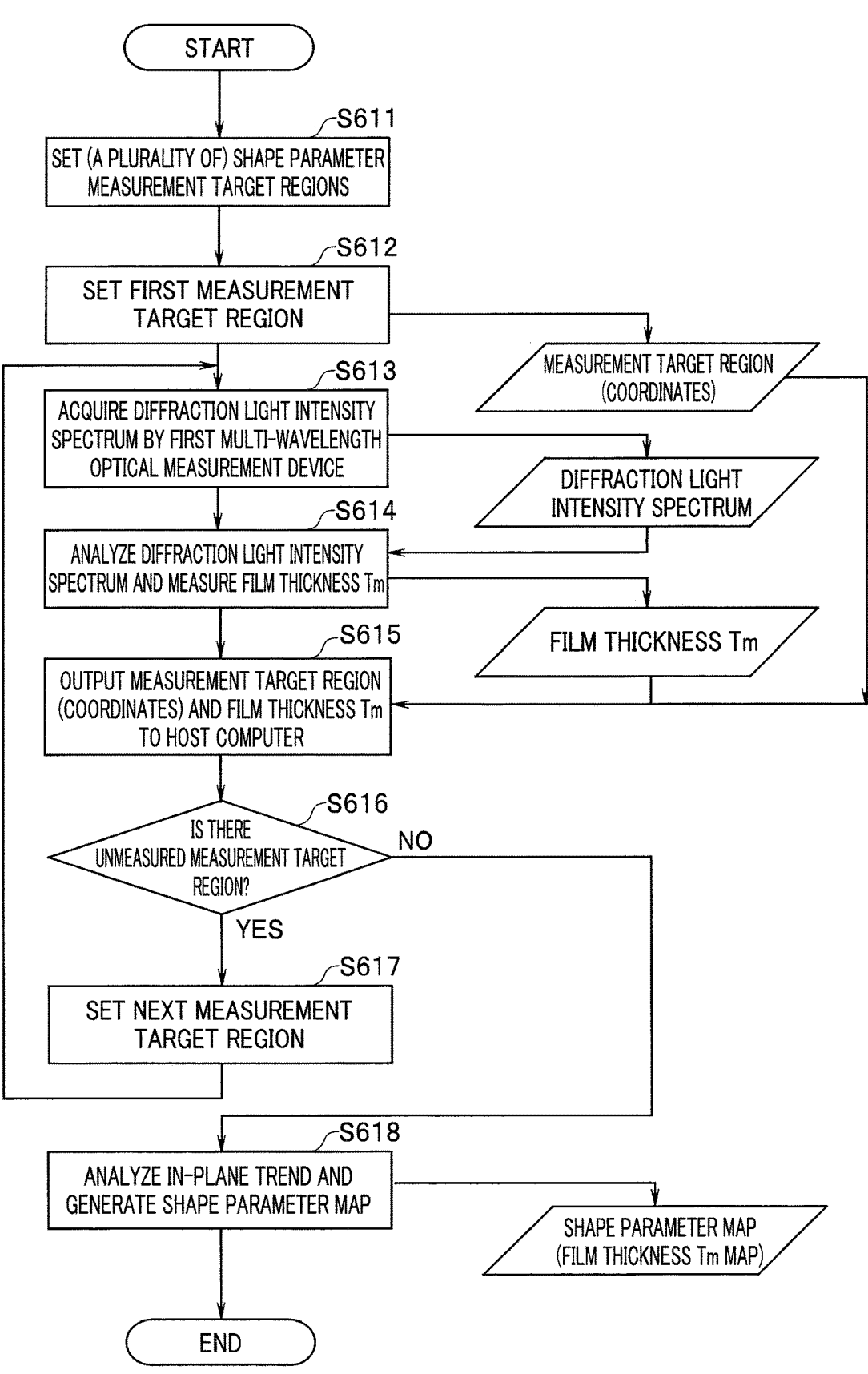
FIG. 28 is a flowchart for explaining an example of the measurement method according to the second embodiment.
Figure 29:
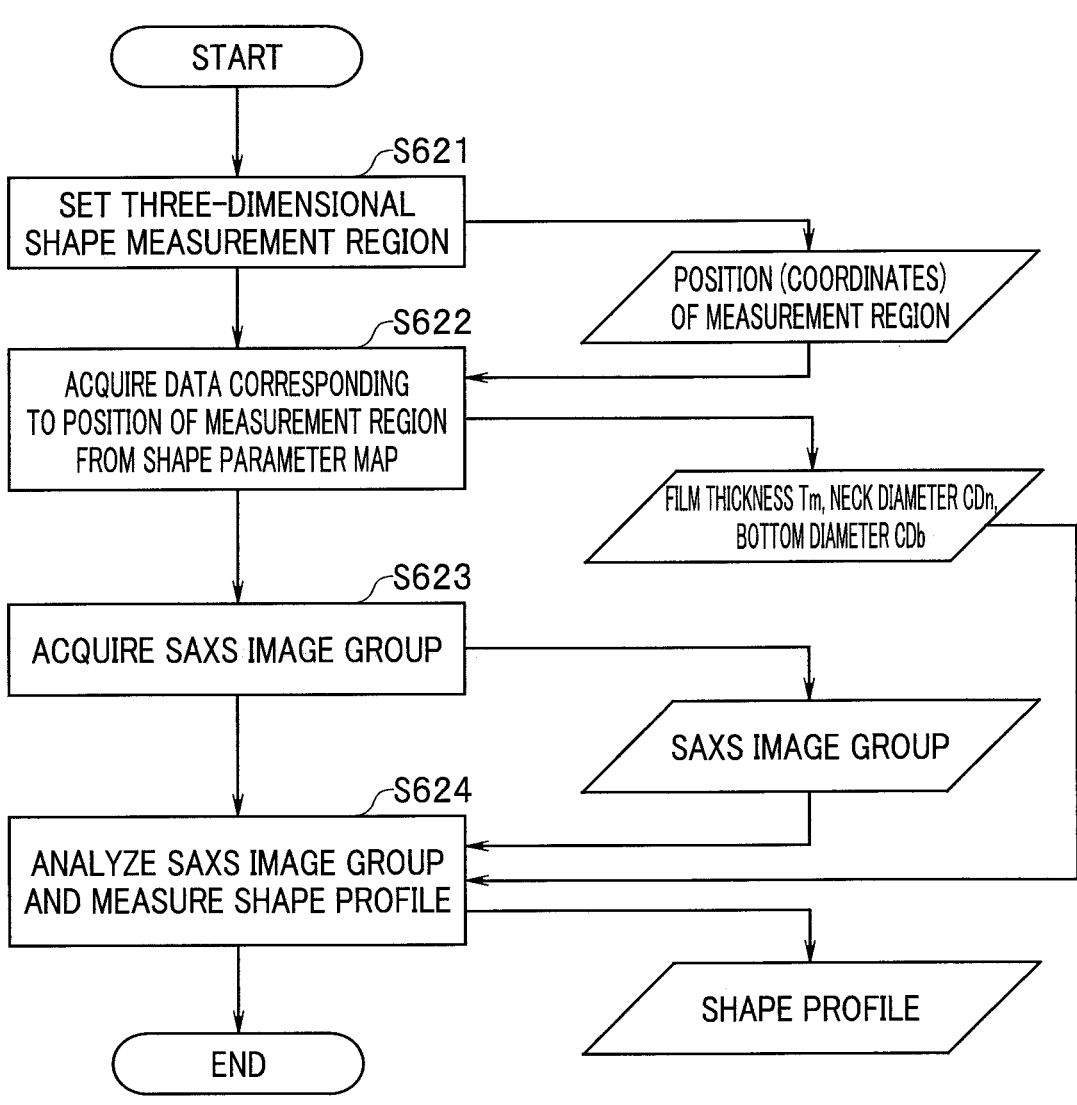
FIG. 29 is a flowchart for explaining an example of the measurement method according to the second embodiment.

FIGS. 27 to 29 are flowcharts for explaining an example of the measurement method according to the second embodiment. Rectangles, parallelograms, and arrows illustrated in the drawings have same meanings as the meanings in FIG. 12. As illustrated in FIG. 27, the shape parameter map 51 is generated first (S61). FIG. 28 illustrates a specific procedure in S61 by using the film thickness Tm as an example. Maps for the other shape parameters (such as the neck diameter CDn and the bottom diameter CDb) are also acquired similarly to the procedure illustrated in FIG. 28.

First, the host computer 4' sets measurement target regions of the film thickness Tm, which is a shape parameter, at a plurality of locations and provides an instruction to the first multi-wavelength optical measurement device 31 (S611). The first multi-wavelength optical measurement device 31 adjusts a position of the object 7 such that an initial measurement target region is irradiated with light (S612) and acquires a diffraction light intensity spectrum (S613). The diffraction light intensity spectrum acquired in S613 is analyzed, and the film thickness Tm of the etching mask film 73 formed on the surface of the object 7 is measured (S614). The first multi-wavelength optical measurement device 31 outputs coordinates of the measurement target regions set in S612 and the film thickness Tm measured in S614 to the host computer 4'. In a case where there is a region where the film thickness Tm has not yet been measured from among the measurement target regions indicated by the instruction in S611 (S616, YES), the position of the object 7 is adjusted such that the next measurement target region is irradiated with light (S617), the procedure in S613 to S615 is repeatedly executed, and measurement of the film thickness Tm is continued. On the other hand, in a case where there is no region where the film thickness Tm has not yet been measured from among the measurement target regions indicated by the instruction in S611 (S616, NO), the host computer 4' analyzes input data, analyzes an in-plane trend of the film thickness Tm, and generates the shape parameter map 51 (film thickness Tm map) (S618). Maps of the shape parameters (such as the neck diameter CDn and the bottom diameter CDb) other than the film thickness Tm are also generated in accordance with the procedure illustrated in FIG. 28.

Returning to FIG. 27, the T-SAXS measurement device 2 acquires data of the shape parameters corresponding to the three-dimensional shape measurement regions from the shape parameter map 51 generated in S61 and measures the shape of the hole (S62). A specific procedure in S62 will be described by using FIG. 29.

First, three-dimensional shape measurement regions are set in the object 7 (S621). Next, data (values of the film thickness Tm, the neck diameter CDn, and the bottom diameter CDb) at the positions of the measurement regions set in S621 are acquired from the shape parameter maps 51 (S622). Subsequently, the T-SAXS measurement device 2 performs measurement while changing a rotation angle of the measurement stage 22 and acquires a plurality of diffraction images (SAXS image group) for the measurement regions of the object 7 (S623). The SAXS image group acquired in S623 is analyzed, three-dimensional shapes of the measurement regions of the object 7 are estimated, and shape profiles are thereby acquired (S624). In the analysis of the SAXS image group in S624, the analysis section 24 sets the various shape parameters (the film thickness Tm, the neck diameter CDn, and the bottom diameter CDb) acquired in S622 as analysis parameters and analyzes three-dimensional shapes.

As described above, according to the measurement device of the present embodiment, the shape parameters are measured at a plurality of locations in the plane of the object 7 prior to measurement of the three-dimensional shapes, and an in-plane trend of the shape parameters are analyzed. When the analysis results are stored as the shape parameter maps in the database 5' and the three-dimensional shapes are measured, values of the shape parameters in the measurement regions are extracted from the shape parameter maps 51 and are used to analyze the SAXS image group. In this manner, there is no need to measure the shape parameters again even in a case where the measurement regions are changed, and it is possible to analyze the SAXS image with high accuracy in a short time period. Note that at least one of the center profile Pc, the tilt T, or the bow diameter CDbw may be added to the shape parameters in addition to the film thickness Tm, the neck diameter CDn, and the bottom diameter CDb.

While certain embodiments have been described, these embodiments have been presented by way of example only, and are not intended to limit the scope of the inventions. Indeed, the novel devices and systems described herein may be embodied in a variety of other forms; furthermore, various omissions, substitutions and changes in the form of the devices and systems described herein may be made without departing from the spirit of the inventions. The accompanying claims and their equivalents are intended to cover such forms or modifications as would fall within the scope and spirit of the inventions.

What is claimed is:

1. A measurement device comprising:
an X-ray irradiation section configured to irradiate an object with X-rays;
an X-ray detection section configured to detect scattered X-rays emitted from the object through the irradiation with the X-rays; and
an analysis section configured to analyze a plurality of diffraction images obtained through photoelectric conversion of the scattered X-rays and estimate a three-dimensional shape of a measurement region of the object irradiated with the X-rays,
wherein a first film formed of a first material and a second film formed of a second material that is different from the first material are stacked in the measurement region of the object, and a recessed portion that penetrates through the second film and reaches inside of the first film is formed at a part of the measurement region,
the analysis section estimates a three-dimensional shape of the recessed portion on the basis of the plurality of diffraction images acquired while an irradiation angle of the X-rays with respect to the object is changed and shape data obtained by measuring the object in advance, and
the shape data includes a film thickness of the second film, a minimum dimension of the recessed portion inside the second film, and a dimension of the recessed portion at an interface between the first film and the second film.

2. The measurement device according to claim 1, wherein the shape data further includes a center profile of the recessed portion.

3. The measurement device according to claim 1, wherein the shape data further includes an inclination level of the recessed portion.

4. The measurement device according to claim 1, wherein the shape data further includes a maximum dimension of the recessed portion inside the first film.

5. The measurement device according to claim 1,
wherein the X-ray irradiation section irradiates a front surface side of the object with the X-rays, and
the X-ray detection section detects the scattered X-rays on a rear surface side of the object.

6. The measurement device according to claim 1, wherein the film thickness of the second film is measured by a first multi-wavelength optical measurement device that emits infrared light, and
the first multi-wavelength optical measurement device is different from the measurement device.

7. The measurement device according to claim 1, wherein the minimum dimension of the recessed portion inside the second film is measured by an electron beam measurement device, and the electron beam measurement device is different from the measurement device.

8. The measurement device according to claim 6, wherein the dimension of the recessed portion at the interface between the first film and the second film is measured by a second multi-wavelength optical measurement device that emits infrared light, and the second multi-wavelength optical measurement device is different from the measurement device.

9. A measurement system comprising:

a measurement device including an X-ray irradiation section configured to irradiate an object with X-rays, an X-ray detection section configured to detect scattered X-rays emitted from the object through the irradiation with the X-rays, and an analysis section configured to analyze a plurality of diffraction images obtained through photoelectric conversion of the scattered X-rays and estimate a three-dimensional shape of a measurement region of the object irradiated with the X-rays; and an information processing device configured to estimate, from shape data obtained by performing measurement in advance at a plurality of positions of the object, an in-plane distribution of the shape data in the object, wherein a first film formed of a first material and a second film formed of a second material that is different from the first material are stacked in the measurement region of the object, and a recessed portion that penetrates through the second film and reaches inside of the first film is formed at a part of the measurement region, the shape data includes at least one of a film thickness of the second film, a minimum dimension of the recessed portion inside the second film, a dimension of the recessed portion at an interface between the first film and the second film, a center profile of the recessed portion, an inclination level of the recessed portion, or a maximum dimension of the recessed portion inside the first film, the analysis section estimates a three-dimensional shape of the recessed portion on the basis of the plurality of diffraction images acquired while an irradiation angle of the X-rays with respect to the object is changed and the shape data inputted from the information processing device, and the information processing device extracts the shape data at a position of the measurement region from the in-plane distribution and inputs the shape data to the measurement device.

10. The measurement system according to claim 9, wherein the X-ray irradiation section irradiates a front surface side of the object with the X-rays, and the X-ray detection section detects the scattered X-rays on a rear surface side of the object.

11. The measurement system according to claim 9, further comprising a first multi-wavelength optical measurement device that emits infrared light, wherein the film thickness of the second film is measured by the first multi-wavelength optical measurement device.

12. The measurement system according to claim 9, further comprising an electron beam measurement device, wherein the minimum dimension of the recessed portion inside the second film is measured by the electron beam measurement device.

13. The measurement system according to claim 11, further comprising a second multi-wavelength optical measurement device that emits infrared light, wherein the dimension of the recessed portion at the interface between the first film and the second film is measured by the second multi-wavelength optical measurement device.

14. A measurement method comprising:

detecting scattered X-rays emitted from an object through irradiation with X-rays while an irradiation angle of the X-rays with respect to the object is changed;

performing photoelectric conversion on the scattered X-rays and acquiring a plurality of diffraction images for each irradiation angle; and estimating a three-dimensional shape of a measurement region of the object irradiated with the X-rays on the basis of the plurality of diffraction images and shape data obtained by measuring the object in advance, wherein a first film formed of a first material and a second film formed of a second material that is different from the first material are stacked in the measurement region of the object, and a recessed portion that penetrates through the second film and reaches inside of the first film is formed at a part of the measurement region, and the shape data includes a film thickness of the second film, a minimum dimension of the recessed portion inside the second film, and a dimension of the recessed portion at an interface between the first film and the second film.

15. The measurement method according to claim 14, wherein the shape data further includes a center profile of the recessed portion.

16. The measurement method according to claim 14, wherein the shape data further includes an inclination level of the recessed portion.

17. The measurement method according to claim 14, wherein the shape data further includes a maximum dimension of the recessed portion inside the first film.

18. The measurement method according to claim 14, further comprising:

using a first multi-wavelength optical measurement device that emits infrared light; and measuring the film thickness of the second film by the first multi-wavelength optical measurement device.

19. The measurement method according to claim 14, further comprising:

using an electron beam measurement device; and measuring the minimum dimension of the recessed portion inside the second film by the electron beam measurement device.

20. The measurement method according to claim 18, further comprising:

using a second multi-wavelength optical measurement device that emits infrared light; and measuring the dimension of the recessed portion at the interface between the first film and the second film by the second multi-wavelength optical measurement device.

* * * * *